US012643268B2

(12) United States Patent
Yanagisawa et al.

(10) Patent No.: US 12,643,268 B2
(45) Date of Patent: Jun. 2, 2026

(54) COMPRESSION MOLDING DEVICE

(71) Applicant: Yamaha Robotics Co., Ltd., Tokyo (JP)

(72) Inventors: Makoto Yanagisawa, Nagano (JP); Shusaku Tagami, Nagano (JP)

(73) Assignee: Yamaha Robotics Co., Ltd., Tokyo (JP)

( * ) Notice: Subject to any disclaimer, the term of this patent is extended or adjusted under 35 U.S.C. 154(b) by 51 days.

(21) Appl. No.: 18/276,881

(22) PCT Filed: Apr. 28, 2022

(86) PCT No.: PCT/JP2022/019416
§ 371 (c)(1),
(2) Date: Aug. 10, 2023

(87) PCT Pub. No.: WO2022/255021
PCT Pub. Date: Dec. 8, 2022

(65) Prior Publication Data
US 2024/0116224 A1 Apr. 11, 2024

(30) Foreign Application Priority Data
Jun. 3, 2021 (WO) .................. PCT/JP2021/021205

(51) Int. Cl.
*B29C 43/58* (2006.01)
(52) U.S. Cl.
CPC ...... *B29C 43/58* (2013.01); *B29C 2043/5825* (2013.01); *B29C 2043/5875* (2013.01)
(58) Field of Classification Search
None
See application file for complete search history.

(56) References Cited

U.S. PATENT DOCUMENTS

2010/0046703 A1* 2/2010 Hirose .................. G01G 9/005
378/54

FOREIGN PATENT DOCUMENTS

JP 2003165133 6/2003
JP 2003231145 8/2003
(Continued)

OTHER PUBLICATIONS

Machine English translation of JP-2003165133-A, Accessed Mar. 28, 2025 (Year: 2003).*
(Continued)

*Primary Examiner* — Abbas Rashid
*Assistant Examiner* — Adrianna N Konves
(74) *Attorney, Agent, or Firm* — JCIPRNET

(57) ABSTRACT

A compression molding device compression-molds resin to a workpiece in which components are mounted on a carrier via connection members, and produces packages each having at least one component resin-sealed therein. The compression molding device comprises: a measuring part measuring the weight of the workpiece; a calculation part calculating the supply amount of the resin based on the weight of the workpiece measured by the measuring part; a supply part supplying the resin in the supply amount calculated by the calculation part; and a molding die for compression-molding, to the workpiece, the resin supplied by the supply part. The calculation part calculates the total volume of mounted objects, including the components and the connection members, based on the weight of the workpiece and calculates the supply amount of the resin based on the total volume of the mounted objects.

6 Claims, 12 Drawing Sheets

1

(56)          References Cited

FOREIGN PATENT DOCUMENTS

| JP | 2003258172 | 9/2003 |
| JP | 2009088403 | 4/2009 |
| JP | 2010040939 | 2/2010 |
| JP | 2017226202 | 12/2017 |
| JP | 2019145550 | 8/2019 |

OTHER PUBLICATIONS

"International Search Report (Form PCT/ISA/210) of PCT/JP2022/019416", mailed on Jul. 26, 2022, with English translation thereof, pp. 1-4.
"Office Action of Germany Counterpart Application", issued on Apr. 11, 2025, with English translation thereof, p. 1-p. 6.
"Notice for Submission of Opinion of Korea Counterpart Application", issued on Nov. 25, 2025, with English translation thereof, pp. 1-14.

* cited by examiner

S110

Start

S111 — Register the reference workpiece weight and the reference resin amount

S112 — Measure the weight of the workpiece

S113 — Calculate the weight difference of the workpiece

S114 — Calculate the corrected resin amount based on the weight difference of the workpiece S115 — Include the corrected resin amount in the reference resin amount End

S130

Start

S131 — Measure the thickness of the workpiece

S132 — Calculate the mounting status of the component

S133 — Calculate the supply position of the resin

End

S140

Start

S141 — Capture an image of the workpiece

S142 — Calculate the mounting status of the component

S143 — Calculate the supply position of the resin

End

S210

S211 — Register the maximum workpiece weight, the minimum workpiece weight, and the maximum number of packages S212 — Calculate the weight range and divide the weight range into a plurality of subranges S213 — Measure the weight of the workpiece S214 — Calculate the supply amount of the resin based on the subrange to which the weight of the workpiece belongs

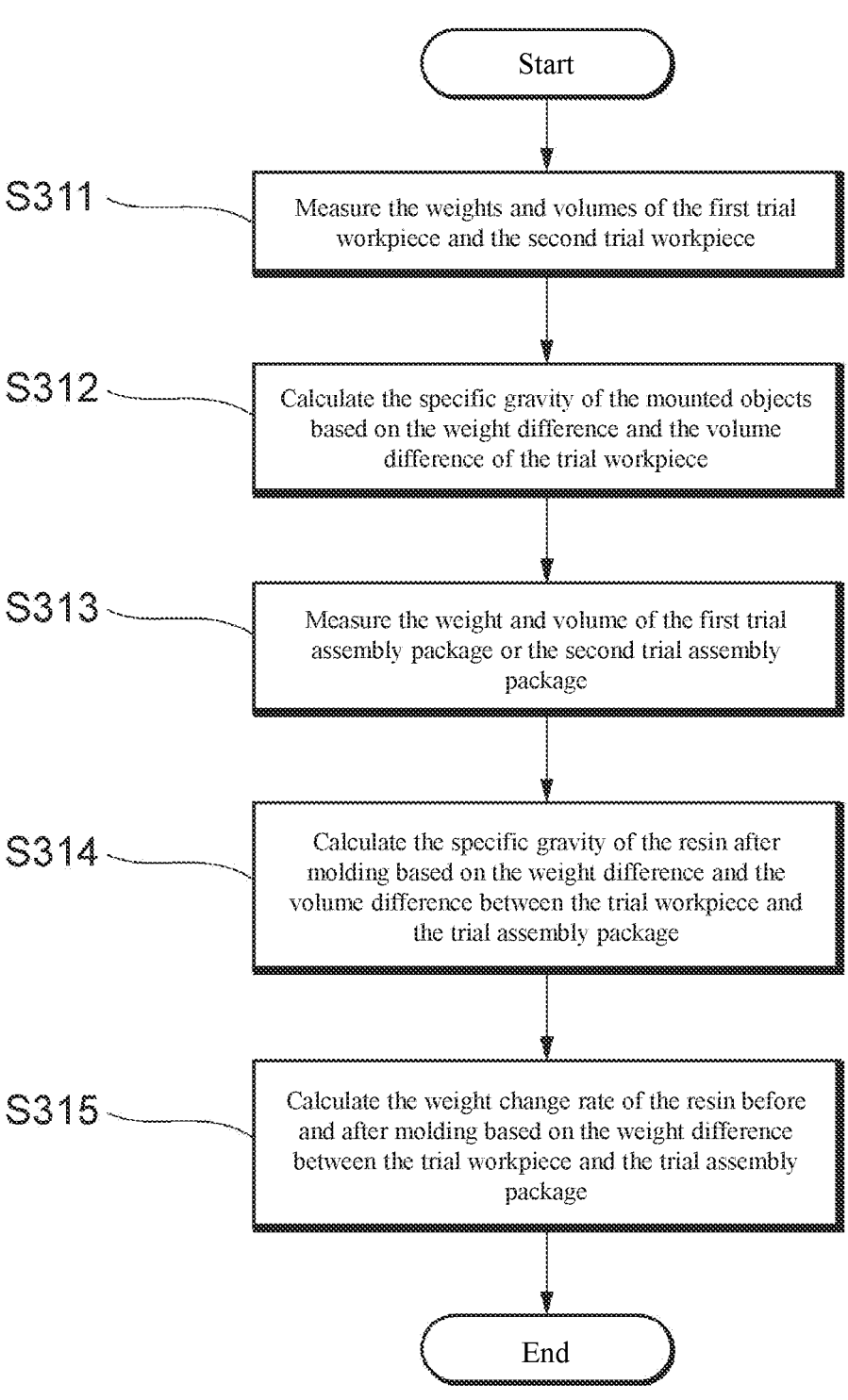

S311 — Measure the weights and volumes of the first trial workpiece and the second trial workpiece S312 — Calculate the specific gravity of the mounted objects based on the weight difference and the volume difference of the trial workpiece S313 — Measure the weight and volume of the first trial assembly package or the second trial assembly package S314 — Calculate the specific gravity of the resin after molding based on the weight difference and the volume difference between the trial workpiece and the trial assembly package S315 — Calculate the weight change rate of the resin before and after molding based on the weight difference between the trial workpiece and the trial assembly package

FIG. 10

COMPRESSION MOLDING DEVICE

CROSS-REFERENCE TO RELATED APPLICATION

This application is a 371 application of the International PCT application serial no. PCT/JP2022/019416, filed on Apr. 28, 2022, which claims the priority benefits of International Patent Application No. PCT/JP2021/021205, filed on Jun. 3, 2021. The entirety of the above-mentioned patent application is hereby incorporated by reference herein and made a part of this specification.

TECHNICAL FIELD

The present invention relates to a compression molding device.

RELATED ART

A molding device is known as a device for manufacturing packages having components such as semiconductor elements sealed with resin therein. The molding device molds resin to a workpiece, in which a plurality of components are mounted on a carrier, to collectively form a plurality of packages. One of such molding devices is a compression molding device in which one of a pair of molds has a cavity with a variable structure. To improve the accuracy of the thickness of the package, the compression molding device has a function of adjusting the amount of resin supplied, for example, according to the number of missing components in the workpiece.

Patent Literature 1 discloses a liquid material ejection device that subtracts the weight of one single substrate from the weight of the workpiece with chip removal taken into account, which is measured by a weight measuring device, then divides the obtained weight by the weight per chip to obtain the number of chips mounted on the workpiece, subtracts it from the number of regular chips to calculate the number of missing chips, and multiplies the number of missing chips by the amount of resin to be replenished for one missing chip to calculate a corrected resin amount.

CITATION LIST

Patent Literature

[Patent Literature 1] Japanese Patent Application Laid-Open No. 2003-165133

SUMMARY OF INVENTION

Technical Problem

The components are mounted on the carrier via connection members such as bonding wires, solder, and anisotropic conductive adhesive. When the workpiece has a component missing, the volume of the workpiece also changes corresponding to the volume of the connection member even though it is smaller than the volume of the component. The weight and volume of the connection member change depending on the shape, size, etc. of the connection member when the component is actually mounted on the carrier. For this reason, it is necessary to measure the accurate weight and volume of the mounted object, which includes the connection member in addition to the component, when it is actually mounted on the workpiece. However, it is unclear about how to measure the weight per chip and the amount of resin to be replenished for one missing chip, as described in Patent Literature 1, so it is unclear whether the connection member is taken into consideration. Further, if a part of or the entire connection member is missing due to the loss of a part of one chip, the quantity of missing chips and the quantity of missing connection members may not match. Therefore, the corrected resin amount calculated based on the quantity of missing chips and the weight per chip, as described in Patent Literature 1, may cause an error in the thickness of the package.

In view of these circumstances, the present invention provides a compression molding device that is capable of improving the accuracy of resin supply.

Solution to Problem

A compression molding device according to one aspect of the present invention is provided for compression-molding resin to a workpiece, in which a plurality of components are mounted on a carrier via a plurality of connection members, and manufacturing a plurality of packages each having at least one of the components sealed with the resin. The compression molding device includes: a measuring part measuring a weight of the workpiece; a calculation part calculating a supply amount of the resin based on the weight of the workpiece measured by the measuring part; a supply part supplying the resin in the supply amount calculated by the calculation part; and a molding die compression-molding the resin supplied by the supply part to the workpiece. The calculation part calculates a total volume of a plurality of mounted objects, which include the plurality of components and the plurality of connection members, based on the weight of the workpiece, and calculates the supply amount of the resin based on the total volume of the plurality of mounted objects.

According to this aspect, it is possible to easily and quickly adjust the supply amount of the resin according to the status of the components on the carrier. In addition, the supply amount of the resin is calculated based on the total volume of the mounted objects mounted thereon in consideration of not only the quantity of components but also the quality of connection members, which improves the accuracy in calculating the supply amount of the resin and suppresses the occurrence of defective products due to excess or deficiency of resin.

In the above aspect, the calculation part may calculate a total weight of the plurality of mounted objects based on the weight of the workpiece, and calculate the total volume of the plurality of mounted objects based on the total weight of the plurality of mounted objects.

In the above aspect, the calculation part may calculate the total volume of the plurality of mounted objects from the total weight of the plurality of mounted objects based on a specific gravity of the plurality of mounted objects.

In the above aspect, the measuring part may measure a weight of a first trial workpiece in which a first number of sets of mounted objects are mounted on a reference carrier, and a weight of a second trial workpiece in which a second number of sets of mounted objects are mounted on the reference carrier, and the second number of sets is different from the first number of sets. The calculation part may calculate the specific gravity of the plurality of mounted objects by dividing a weight difference between the weight of the first trial workpiece and the weight of the second trial workpiece by a volume difference between a volume of the first trial workpiece and a volume of the second trial workpiece.

In the above aspect, the measuring part may measure a weight of a first trial workpiece in which no mounted object is mounted on a reference carrier, and a weight of a second trial workpiece in which all mounted objects are mounted on the reference carrier, and the calculation part may calculate the specific gravity of the plurality of mounted objects by dividing a weight difference between the weight of the first trial workpiece and the weight of the second trial workpiece by a volume difference between a volume of the first trial workpiece and a volume of the second trial workpiece.

In the above aspect, the compression molding device may further include a volume measurement part measuring a volume of the workpiece, and the volume measurement part may measure the volume of the first trial workpiece and the volume of the second trial workpiece.

In the above aspect, the calculation part may calculate the number of sets of the plurality of mounted objects from the weight of the plurality of mounted objects based on a weight of mounted objects per set, and calculate the total volume of the plurality of mounted objects from the number of sets of the plurality of mounted objects based on a volume of mounted objects per set.

In the above aspect, the compression molding device may further include a thickness measurement part measuring a thickness of the package. The measuring part may measure a weight of a third trial workpiece in which a third number of sets of mounted objects are mounted on a reference carrier, and a weight of a fourth trial workpiece in which a fourth number of sets of mounted objects are mounted on the reference carrier. The thickness measurement part may measure a thickness of a first trial assembly package in which a first supply amount of resin is molded to the third trial workpiece, and a thickness of a second trial assembly package in which the first supply amount of resin is molded to the fourth trial workpiece, and the calculation part may calculate the volume of mounted objects per set by multiplying a thickness difference between the thickness of the first trial assembly package and the thickness of the second trial assembly package by an upper surface area of the first trial assembly package or the second trial assembly package, and dividing an obtained product by a difference in the number of sets between the third number of sets and the fourth number of sets, and calculate the weight of mounted objects per set by dividing a weight difference between the weight of the third trial workpiece and the weight of the fourth trial workpiece by the difference in the number of sets.

In the above aspect, the compression molding may further include a thickness measurement part measuring a thickness of the package. The measuring part may measure a weight of a third trial workpiece in which no mounted object is mounted on a reference carrier, and a weight of a fourth trial workpiece in which all mounted objects are mounted on the reference carrier. The thickness measurement part may measure a thickness of a first trial assembly package in which a first supply amount of resin is molded to the third trial workpiece, and a thickness of a second trial assembly package in which the first supply amount of resin is molded to the fourth trial workpiece, and the calculation part may calculate the volume of mounted objects per set by multiplying a thickness difference between the thickness of the first trial assembly package and the thickness of the second trial assembly package by an upper surface area of the first trial assembly package or the second trial assembly package, and dividing an obtained product by the number of sets of mounted objects mounted on the fourth trial workpiece, and calculate the weight of mounted objects per set by dividing a weight difference between the weight of the third trial workpiece and the weight of the fourth trial workpiece by the number of sets of mounted objects mounted on the fourth trial workpiece.

In the above aspect, the calculation part may calculate the weight of the plurality of mounted objects by subtracting a weight of a reference carrier from the weight of the workpiece.

In the above aspect, the compression molding device may further include a thickness measurement part measuring a thickness of the carrier, and the calculation part may calculate a weight of the carrier based on the thickness of the carrier, and calculate the weight of the plurality of mounted objects by subtracting the weight of the carrier from the weight of the workpiece.

In the above aspect, the calculation part may calculate a volume of resin after molding necessary to form the plurality of packages with a desired thickness based on the total volume of the plurality of mounted objects, and calculate a weight of resin after molding as the supply amount of the resin based on the volume of resin after molding.

In the above aspect, the calculation part may calculate a volume of resin after molding necessary to form the plurality of packages with a desired thickness based on the total volume of the plurality of mounted objects, calculate a weight of resin after molding based on the volume of resin after molding, and calculate a weight of resin before molding from the weight of resin after molding as the supply amount of the resin based on a weight change rate of resin before and after molding.

Effects of Invention

According to the present invention, the compression molding device that is capable of improving the accuracy of resin supply is provided.

BRIEF DESCRIPTION OF DRAWINGS

FIG. 10 is a flowchart showing a part of the method of calculating the supply amount of resin.

DESCRIPTION OF EMBODIMENTS

Hereinafter, an embodiment of the present invention will be described with reference to the drawings. However, the drawings of this embodiment are exemplary, the dimensions and shape of each part are schematic, and the technical scope of the present invention should not be construed as being limited to the embodiment.

<Compression Molding Device>

Figure 1:
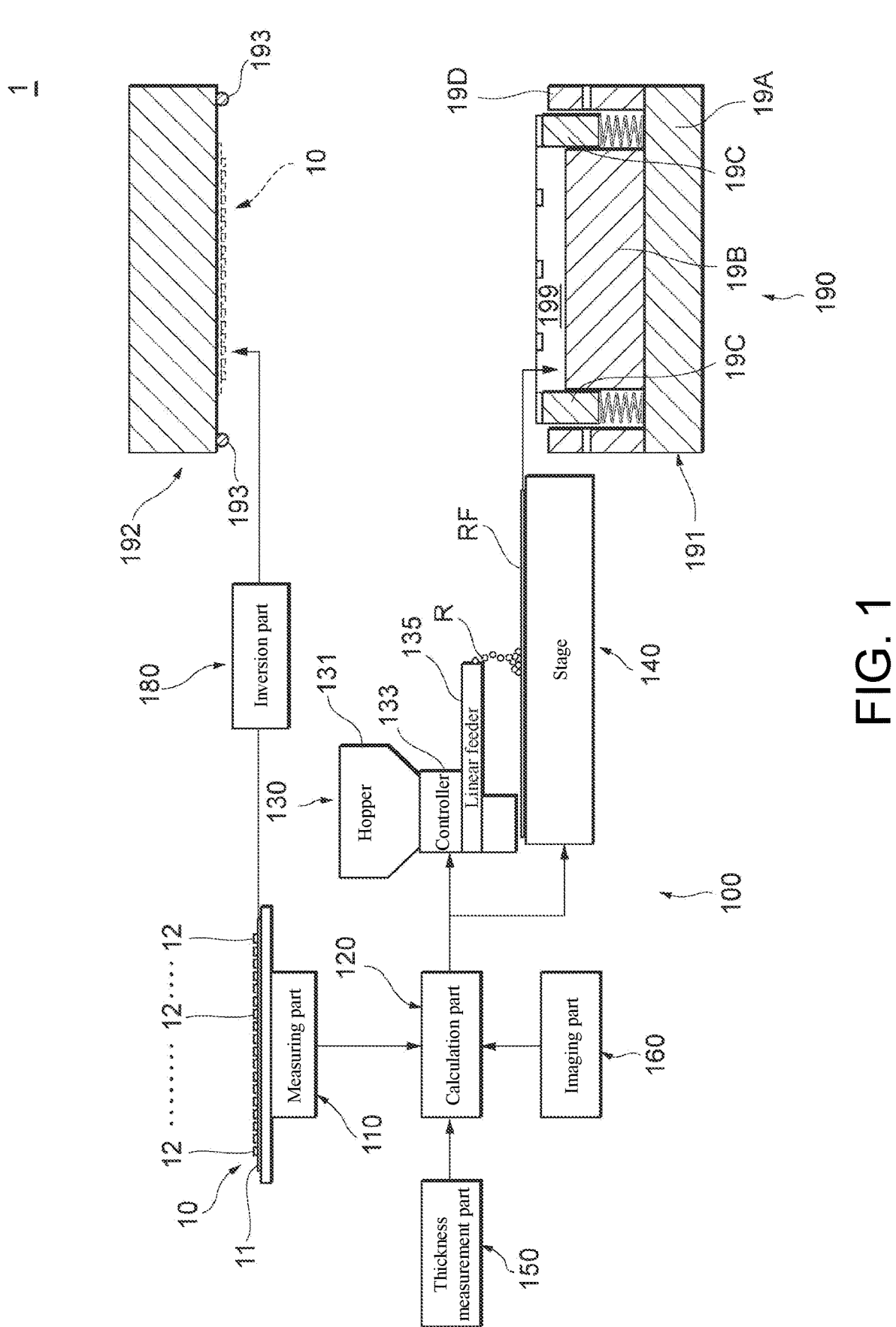
FIG. 1 is a diagram schematically showing the configuration of the compression molding device according to an embodiment.
Figure 2:
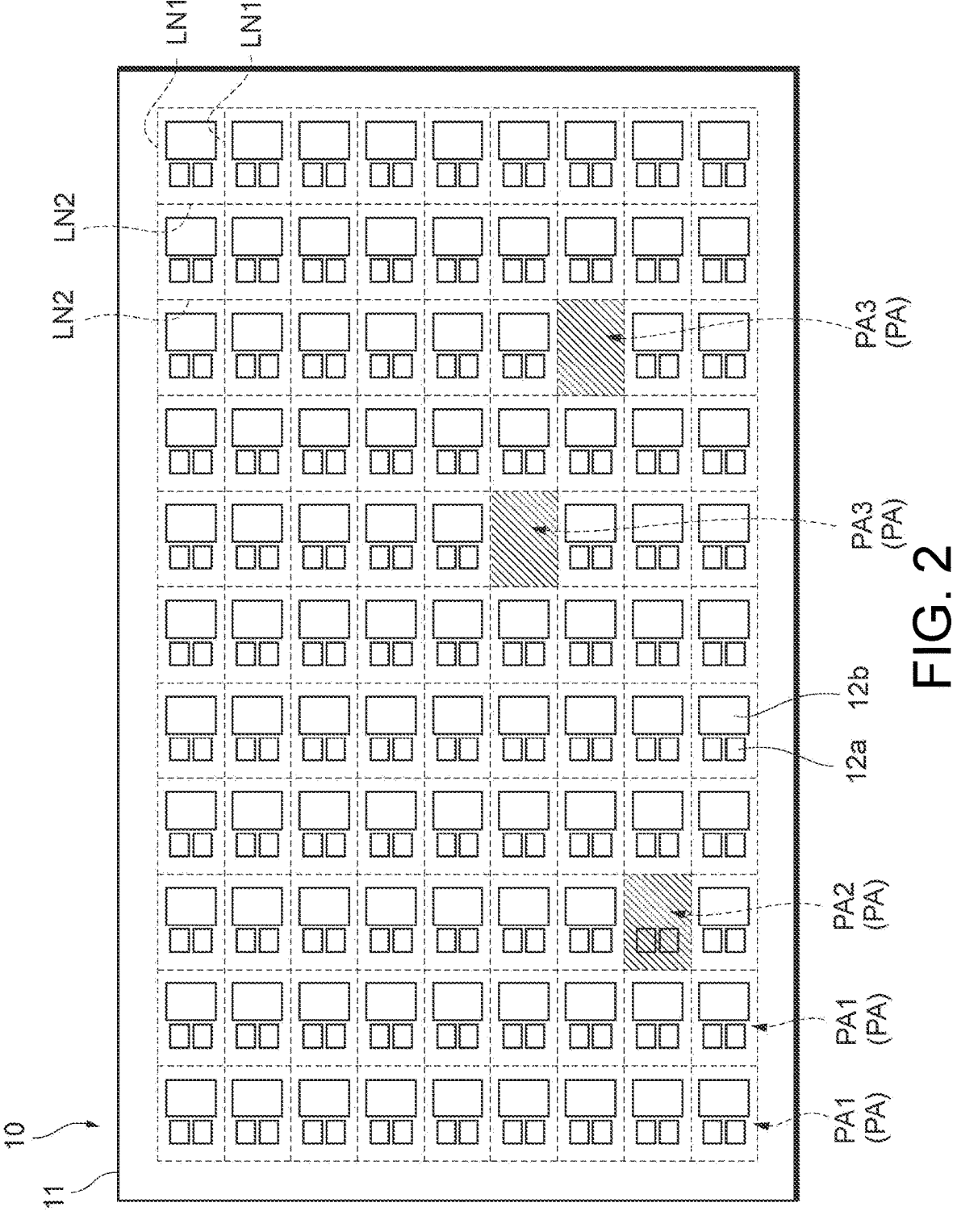
FIG. 2 is a plan view schematically showing the configuration of the workpiece before compressing resin.

The configuration of a compression molding device 1 according to an embodiment of the present invention will be described with reference to FIG. 1 and FIG. 2. FIG. 1 is a diagram schematically showing the configuration of the compression molding device according to an embodiment. FIG. 2 is a plan view schematically showing the configuration of a workpiece before compressing resin.

The compression molding device 1 is a device for compression-molding resin R to a workpiece 10, in which a plurality of components 12 are mounted on a carrier 11, to manufacture a plurality of packages each having at least one component 12 resin-sealed (molded) therein. The compression molding device 1 also manufactures at least one package with no component 12 mounted thereon. The compression molding device 1 includes a resin supply device 100 that supplies the resin R, and a molding die 190 that heats and compresses the resin R.

As an example, the carrier 11 is an interposer substrate, the component 12 is a semiconductor element (IC chip, diode, transistor, or the like) mounted on the carrier 11, and the resin R is granular. However, the carrier 11, the component 12, and the resin R are not limited to the above. For example, the carrier 11 is a substrate made of resin, glass, metal, a semiconductor, or the like, and may be a lead frame, a carrier plate with an adhesive sheet, or the like. For example, the component 12 may be a MEMS device or an electronic device (capacitor, inductor, resistor, or the like). The component 12 may be mounted on the carrier 11 by a wire bonding method or a flip chip method, or may be detachably fixed. The components 12 may include, for example, two types of components 12a and 12b, or may include three or more types of components. The resin R may be in the form of powder, tablet, liquid, or the like. The resin R contains, for example, thermosetting resin such as epoxy resin, and can be molded into any shape by heating compression. The component 12 is mounted on the carrier 11 via a connection member (not shown). The connection member is a member that fixes the component 12 to the carrier 11 or a member that electrically connects the component 12 to the carrier 11. For example, the connection member is a bonding wire, solder, anisotropic conductive adhesive, or the like. Hereinafter, a plurality of components 12 and a plurality of connection members are collectively referred to as a plurality of mounted objects. At least one component 12 mounted in one package area PA and at least one connection member connecting the at least one component 12 to the carrier 11 are combined to form one set of mounted objects. In other words, one set of mounted objects refers to all the sealed objects on the carrier 11 that are to be resin-sealed into one of multiple packages manufactured from the workpiece 10 by the compression molding device 1.

For example, the package molded by the compression molding device 1 may require high accuracy in thickness.

Since the supply amount of the resin R required to manufacture the package with a desired thickness varies depending on the state of the workpiece 10, it is desired to configure the compression molding device 1 to be capable of calculating the supply amount of the resin R with high accuracy.

Here, the relationship between the state of the workpiece 10 and the supply amount of the resin R will be described with reference to the workpiece 10 shown in FIG. 2 as an example. The workpiece 10 is provided with a plurality of package areas PA that are partitioned by a plurality of division lines LN1 and LN2. The division lines LN1 and LN2 are imaginary lines for dividing the workpiece 10, which is compression-molded with the resin R, into a plurality of packages, and the division lines LN1 and the division lines LN2 are substantially orthogonal to each other. The package area PA is an area that serves as a package, and a plurality of package areas PA are arranged in a matrix. A first component 12a and a second component 12b are arranged in a first package area PA1 of the package areas PA. However, in a second package area PA2 and a third package area PA3 of the package areas PA, a part or the entirety of at least one of the first component 12a and the second component 12b is absent. As shown in the second package area PA2, for example, when the workpiece 10 receives an impact, the component 12b may come off, and a part of or the entire the component 12b may be missing. For example, if a part of or the entire component 12b is missing after the component 12b is mounted but the connection member that connects the partly missing component 12b to the carrier 11 is not missing, the quantity of components 12b in the workpiece 10 and the quantity of connection members connecting the components 12b do not match. In addition, as shown in the third package area PA3, for example, the first component 12a and the second component 12b may have been omitted for a portion that cannot be used due to a wiring defect of the carrier 11, in order to reduce component loss. To suppress thinning of the packages in these cases, it is necessary to make adjustment by increasing the supply amount of the resin R by the volumes of the absent first component 12a and second component 12b which were planned to be mounted in the second package area PA2 and the third package area PA3.

The resin supply device 100 calculates the supply amount of the resin R based on the state of the workpiece 10 and supplies the resin R to the workpiece 10 or a release film RF before it is carried into the molding die 190. In the example shown in FIG. 1, the resin supply device 100 supplies the resin R to the release film RF. The resin supply device 100 includes a measuring part 110, a calculation part 120, a supply part 130, a stage 140, a thickness measurement part 150, an imaging part 160, and an inversion part 180.

The measuring part 110 measures the weight of the workpiece 10 and transmits the result of measurement to the calculation part 120. For example, the measuring part 110 is a top pan electronic balance that measures the weight of an object loaded on the upper surface, and loads the workpiece 10 on the upper surface with the mounting surface, which mounts the components 12 thereon, facing upward (opposite to the measuring part 110) to measure the weight of the workpiece 10.

The calculation part 120 calculates the supply amount of the resin R based on the weight of the workpiece 10 measured by the measuring part 110. The calculation part 120 is composed of computer hardware and software. Data for calculating the supply amount of the resin R may be registered in advance in the calculation part 120. The data may include, for example, the standard weight, minimum weight, maximum weight, standard thickness, minimum thickness, maximum thickness, and specific gravity of the carrier 11. In addition, the data may include the standard weight, minimum weight, and maximum weight of the workpiece 10, may include the standard quantity, maximum quantity, minimum quantity, standard total weight, maximum total weight, minimum total weight, and specific gravity of the components 12 mounted on one workpiece 10, may include the standard supply amount, minimum supply amount, maximum supply amount, and specific gravity of the resin R, and may include the number of package areas PA, the desired thickness of the package, the allowable range of the thickness of the package, and the like. The supply amount of the resin R may be specified by volume or may be specified by weight. Also, the supply amount of the resin R may be specified by a control parameter of the supply part 130. Here, the "standard" of the above standard weight, etc. is the average value or median value that is treated as a standard value in the manufacturing process when there is no defect in each of the above items as a product or the number of defects is within the allowable range. The "minimum" and "maximum" of the above weights, etc. are the lower and upper limit values of manufacturing tolerances, respectively. The data registered in the calculation part 120 may include the statistics such as the average value, the median value, and the mode value of each of the weight and thickness of the carrier 11, the weight of the workpiece 10, the quantity and total weight of the components 12, and the supply amount of the resin R. The data registered in the calculation part 120 may be predicted values or measured values.

The carrier 11 with the standard weight corresponds to an example of the "reference carrier" of the present invention, and the standard weight of the carrier 11 corresponds to an example of the "reference carrier weight" of the present invention. The "reference carrier" of the present invention may be a carrier 11 with the minimum weight or the maximum weight, or a carrier 11 with a weight of the average value, the median value, or the mode value. That is, the "reference carrier weight" of the present invention may be the minimum value, maximum value, average value, median value, or mode value of the weight of the carrier 11. The standard quantity of the components 12 corresponds to an example of the "reference component quantity" of the present invention, and the standard total weight of the components 12 corresponds to an example of the "reference component total weight" of the present invention. The "reference component quantity" of the present invention may be the maximum quantity or the minimum quantity of components 12, and the "reference component total weight" of the present invention may be the maximum total weight or the minimum total weight of the components 12.

The workpiece 10 with the standard weight corresponds to an example of the "reference workpiece" of the present invention, and the standard weight of the workpiece 10 corresponds to an example of the "reference workpiece weight" of the present invention. The "reference workpiece" of the present invention is a workpiece with components in the reference component quantity mounted on the reference carrier, and the "reference workpiece weight" of the present invention is the weight of the reference workpiece. The "reference workpiece" of the present invention may be a workpiece 10 with the minimum weight or the maximum weight, and the "reference workpiece weight" of the present invention may be the minimum weight or the maximum weight of the workpiece 10. The maximum weight of the workpiece 10 is, for example, the weight of the workpiece

10 with all the components 12 mounted on the reference carrier. The minimum weight of the workpiece 10 is, for example, the weight of the workpiece 10 with no component 12 mounted on the reference carrier (that is, the reference carrier weight).

The standard supply amount of the resin R corresponds to an example of the "reference resin amount" of the present invention. The "reference resin amount" of the present invention is the amount of resin required for compression-molding the resin R to the reference workpiece with a desired thickness. The "reference resin amount" of the present invention may be the maximum supply amount or the minimum supply amount of the resin R. The minimum supply amount of the resin R is, for example, the amount of resin required for compression-molding the resin R to the workpiece 10 that has the maximum weight with a desired thickness. The maximum supply amount of the resin R is, for example, the amount of resin required for compression-molding the resin R to the workpiece 10 that has the minimum weight with a desired thickness.

The supply part 130 supplies the resin R in the supply amount calculated by the calculation part 120. Although the supply part 130 is configured to supply the resin R to the release film RF in the example shown in FIG. 1, the supply part 130 may be configured to supply the resin R to the workpiece 10. The supply part 130 includes a hopper 131, a controller 133, and a linear feeder 135. The hopper 131 accommodates the resin R. The controller 133 controls the supply amount, supply speed, supply timing, etc. of the resin R based on the result of calculation input from the calculation part 120. The linear feeder 135 feeds out the resin R and drops the resin R from the tip. However, the configuration of the supply part 130 is not limited to the above. For example, when the resin R is liquid, the supply part 130 may include a dispenser having a syringe that stores the resin R, a piston that pushes out the resin R. and a pinch valve that opens and closes the tip of the syringe. Furthermore, the supply part 130 may have a configuration using the linear feeder 135 or a configuration other than the dispenser having the syringe.

The stage 140 is a base for supporting the release film RF to which the resin R is supplied. The stage 140 is configured to be movable relative to the supply part 130. Specifically, at least one of the supply part 130 and the stage 140 is configured to be movable by a moving means such as a servomotor. For example, one of the supply part 130 and the stage 140 moves relative to the other to supply the resin R over a wide range on the release film RF. However, the positions of the supply part 130 and the stage 140 relative to each other may be substantially fixed, and for example, the resin R may be supplied to the central part of the release film RF. The stage 140 may include a vibrator that disperses the resin R supplied onto the release film RF by vibration.

The thickness measurement part 150 measures the thickness of the carrier 11, for example. The thickness measurement part 150 is, for example, a non-contact type measurement instrument such as a reflectance spectroscopy system or an ellipsometer system, but the thickness measurement part 150 is not limited thereto and may be a contact type measurement instrument such as a micrometer system. The thickness measurement part 150 may measure the thickness using a laser displacement meter. For example, the thickness measurement part 150 may measure the thickness at multiple points or at multiple surfaces to measure the thickness distribution within the plane, and may measure the thickness while scanning in the in-plane direction to measure the thickness distribution within the plane. Information measured by the thickness measurement part 150 is transmitted to the calculation part 120 and used to calculate the supply amount of the resin R. For example, the calculation part 120 corrects a weight variation in the weight of the workpiece 10 measured by the measuring part 110, due to a thickness variation of the carrier 11.

The thickness measurement part 150 may measure the thickness of the workpiece 10. The thickness of the workpiece 10 as referred to herein includes information about the mounting status, such as whether there is any component 12 mounted on the carrier 11, and the height and position of the component 12. That is, the information about the mounting status includes the number, positions, density, etc. of the second package area PA2 and the third package area PA3. When measuring the thickness of the workpiece 10, the thickness measurement part 150 preferably measures the thickness using a non-contact type measurement instrument or a laser displacement meter, from the viewpoint of preventing the measurement from causing damage to the component 12. Information about the mounting status, measured by the thickness measurement part 150, is transmitted to the calculation part 120 and used to calculate the supply amount and supply position of the resin R. The supply position of the resin R as referred to herein includes not only information about to the position corresponding to which package area PA the resin R is to be supplied, but also information about for the position corresponding to which package area PA the supply amount of the resin R is to be increased or decreased.

The thickness measurement part 150 may measure the thickness of the package. The thickness of the package measured by the thickness measurement part 150 is transmitted to the calculation part 120. For example, the calculation part 120 may compare the calculated supply amount of the resin R with the thickness of the package compression-molded with the resin R, and adjust the method of calculating the supply amount of the resin R.

The imaging part 160 captures an image of the workpiece 10. The imaging part 160 includes, for example, a camera (a monocular camera or a compound eye camera) and an image processing system that processes the image captured by the camera. Thereby, the imaging part 160 captures an image of the component 12 on the carrier 11 and acquires information about the mounting status by image processing. The information about the mounting status acquired by the imaging part 160 is transmitted to the calculation part 120 and used to calculate the supply amount and supply position of the resin R.

It should be noted that the thickness measurement part 150 and the imaging part 160 may be omitted from the compression molding device 1. Further, the thickness of the carrier 11, the thickness of the workpiece 10, and the thickness of the package may be measured by separate thickness measurement parts.

The inversion part 180 vertically inverts the workpiece 10 measured by the measuring part 110 while the workpiece 10 is being transported into the molding die 190. As shown in FIG. 1, when the workpiece 10 is measured with the components 12 facing upward and is set in an upper die 192, which will be described later, with the components 12 facing downward, the inversion part 180 inverts the vertical direction of the workpiece 10. In addition, when the workpiece 10 is measured with the components 12 facing downward and is set in a lower die 191, which will be described later, with the components 12 facing upward, the inversion part 180 inverts the vertical direction of the workpiece 10. If the orientation of the workpiece 10 when measured by the measuring part 110 is the same as the orientation of the workpiece 10 when set inside the molding die 190, the inversion part 180 is omitted.

The molding die 190 is a pair of dies (lower die 191 and upper die 192) for resin-sealing the workpiece 10 using compression molding technology. The release film RF is set in the die that has a cavity 199, among the lower die 191 and the upper die 192, and the workpiece 10 is set in the other die. Furthermore, the resin R is supplied to one of the release film RF and the workpiece 10 which is set in the lower die 191. In this embodiment, the molding die 190 has a lower die cavity structure that has the cavity 199 in the lower die 191.

The molding die 190 includes a seal ring 193 (for example, an O-ring) that seals the inside of the molding die 190 (the space between the lower die 191 and the upper die 192). Although not shown, the compression molding device 1 includes a pressure adjustment part (for example, a vacuum pump) for adjusting the internal pressure of the molding die 190 and a temperature adjustment part (for example, a heater) for adjusting the internal temperature (molding temperature).

The lower die 191 includes a chase 19A, a cavity piece 19B fixed to the chase 19A on the side of the upper die 192, a clamper 19C surrounding the cavity piece 19B, and a chamber block 19D surrounding the clamper 19C with a space therebetween. The cavity piece 19B is fixed to the chase 19A on the side of the upper die 192. The clamper 19C protrudes toward the upper die 192 from the cavity piece 19B, and forms the cavity 199 together with the cavity piece 19B. The clamper 19C is connected to the chase 19A via a spring, and is configured to be slidable relative to the cavity piece 19B. When the dies are clamped, the outer edge portion (carrier 11) of the workpiece 10 is sandwiched between the clamper 19C and the upper die 192. A plurality of air vents that connect the space on the side of the chamber block 19D and the cavity 199 are provided on the upper surface of the clamper 19C (the surface facing the upper die 192). The air vents are radially arranged grooves centered on the cavity 199. The air vents function as exhaust holes for discharging air remaining in the cavity 199 of the clamped molding die 190 and gas generated from the resin R. The air vents are formed to a depth (for example, about several micrometers (μm)) that allows air or gas to be discharged but does not allow the resin R to flow out. The seal ring 193 contacts the chamber block 19D.

The compression molding device 1 according to this embodiment may further include a volume measurement part. The volume measurement part is not particularly limited as long as the volume measurement part is capable of measuring the volume of the workpiece 10, the volume of the assembly package formed by molding the resin R to the workpiece 10, the volume of the carrier 11, the volume of the mounted objects mounted on the workpiece 10, or the like.

Next, an example of a method of manufacturing a package using the compression molding device 1 will be described with reference to FIG. 3 to FIG. 7.

Figure 3:
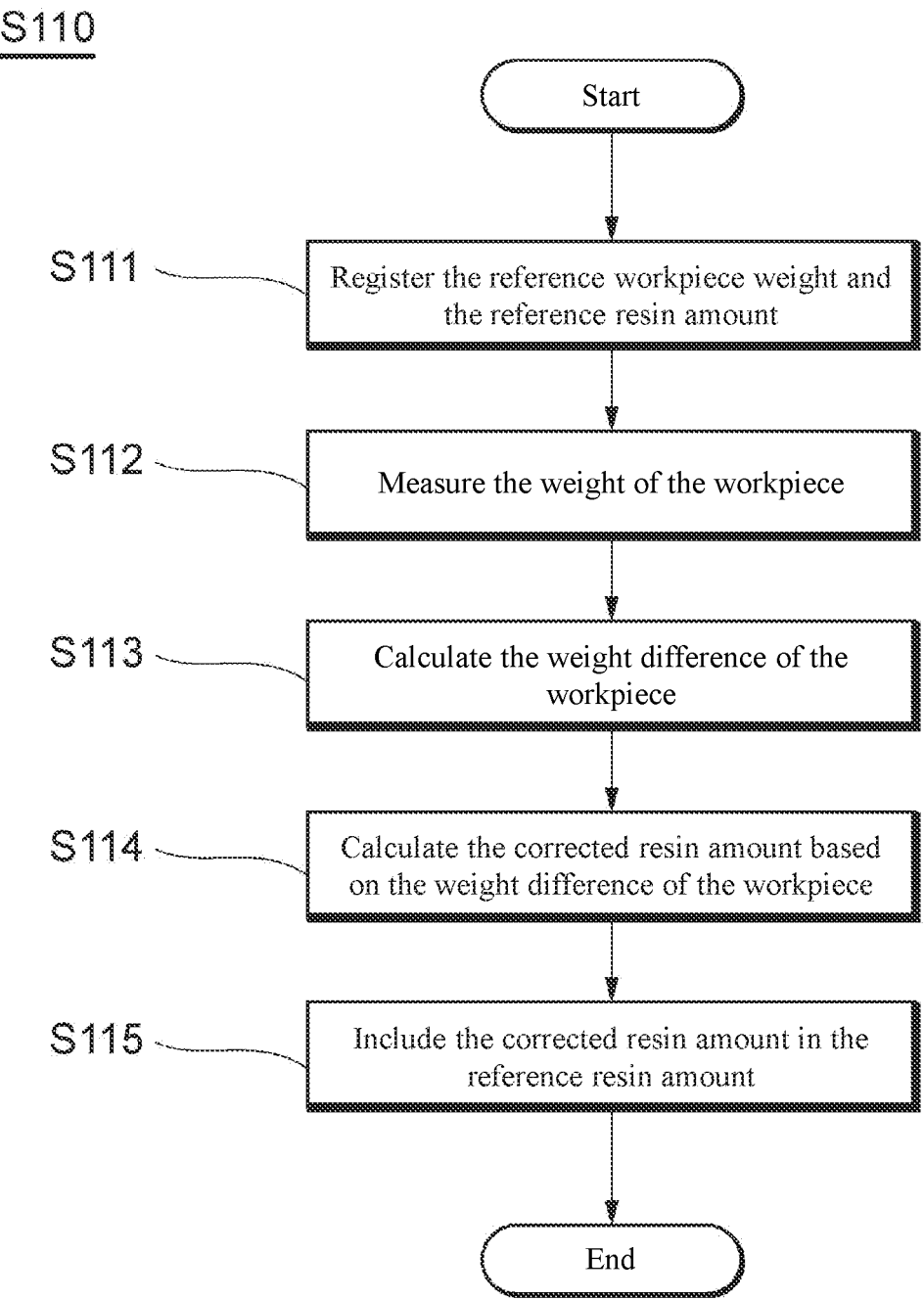
FIG. 3 is a flowchart showing an example of the method of calculating the supply amount of resin.

FIG. 3 is a flowchart showing an example of a method (S110) of calculating the supply amount of the resin R. In the method S110 of calculating the supply amount of the resin R, first, the reference workpiece weight and the reference resin amount are registered (S111). For example, the reference workpiece weight and the reference resin amount are input to the calculation part 120 from an external terminal. In this calculation method S110, the reference workpiece weight is the weight of the workpiece 10 (hereinafter referred to as "reference workpiece") with all the components 12 mounted on the reference carrier. In other words, the reference workpiece weight is the weight of the work-piece 10 in which all the package areas PA are the first package areas PA1. For example, a carrier 11 with the standard weight is used as the reference carrier. In this case, the reference resin amount is the supply amount of the resin R required to compression-mold the resin R to the reference workpiece with all the components 12 mounted thereon to obtain a package with a desired thickness. Nevertheless, it is also possible to use a carrier 11 with the minimum weight as the reference carrier. In this case, the reference resin amount is the supply amount of the resin R required to compression-mold the resin R to the reference workpiece with no com-ponent 12 mounted thereon to obtain a package with a desired thickness.

Next, the weight of the workpiece 10 is measured (S112), and the weight difference of the workpiece 10 is calculated (S113). The weight of the workpiece 10 is measured by the measuring part 110 and the weight difference of the work-piece 10 is calculated by the calculation part 120. The weight difference of the workpiece 10 is the difference between the reference workpiece weight and the measured weight of the workpiece 10. The workpiece 10 may have a second pack-age area PA2 in which some of the components 12 are absent and a third package area PA3 in which all the components 12 are absent. For example, the third package areas PA3 may be scattered due to defects in the internal wiring of the substrate, or half of the carrier 11 may be the third package areas PA3 for all the components 12 cannot be mounted. Thus, the absent components 12 that were planned to be mounted in the second package area PA2 or the third package area PA3 are collectively referred to as "absent components 12." The weight of the workpiece 10 measured in step S112 is smaller than the reference workpiece weight by the weight of the absent components 12. In step S113, the weight of the workpiece 10 measured in step S112 is subtracted from the reference workpiece weight to calculate the weight of the absent components 12 as the weight difference of the workpiece 10.

Next, the corrected resin amount is calculated based on the weight difference of the workpiece 10 (S114), and the corrected resin amount is included in the reference resin amount (S115). The corrected resin amount is calculated by the calculation part 120 and is included in the reference resin amount by the calculation part 120. When the resin R in the reference resin amount is compression-molded to the work-piece 10 that has the second package area PA2 and the third package area PA3, the thickness of the package is reduced corresponding to the absent components 12. Thus, in step S115, the corrected resin amount for the absent components 12 is added to the reference resin amount in order to obtain a package with a desired thickness. In step S114, the corrected resin amount is calculated as, for example, the weight of the resin R. and is calculated by multiplying the weight difference of the workpiece 10 by the specific gravity of the resin R and dividing the product by the specific gravity of the component 12. When the specific gravity of the resin R and the specific gravity of the component 12 are close, the weight difference of the workpiece 10 may be used as the corrected resin amount.

Calculating the supply amount of the resin R based on the weight of the workpiece 10 in this manner makes it possible to calculate the supply amount of the resin R easily and quickly. That is, compared to a compression molding device configured to scan substantially the entire surface of a workpiece to measure the thickness and examine the mount-ing status of all the components, the compression molding device according to this embodiment and the compression molding method using the compression molding device improve the production capacity of packages.

In addition, in the method S110 of calculating the supply amount of the resin R, the reference workpiece weight may be the weight of the workpiece 10 with no component 12 mounted on the reference carrier as described above. In other words, the reference workpiece weight may be the weight of the reference carrier. The reference resin amount at this time is the supply amount of the resin R required to compression-mold the resin R to the reference workpiece with no component mounted thereon to obtain a package with a desired thickness. In this case, the weight of the workpiece 10 measured in step S112 becomes larger than the reference workpiece weight by the weight of the mounted components 12. The weight of the mounted components 12 is calculated as the weight difference of the workpiece 10 by subtracting the reference workpiece weight from the weight of the workpiece 10 measured in step S112. At this time, in step S115, the supply amount of the resin R is calculated by subtracting the corrected resin amount for the components 12 mounted on the workpiece 10 from the reference resin amount.

Figure 4:
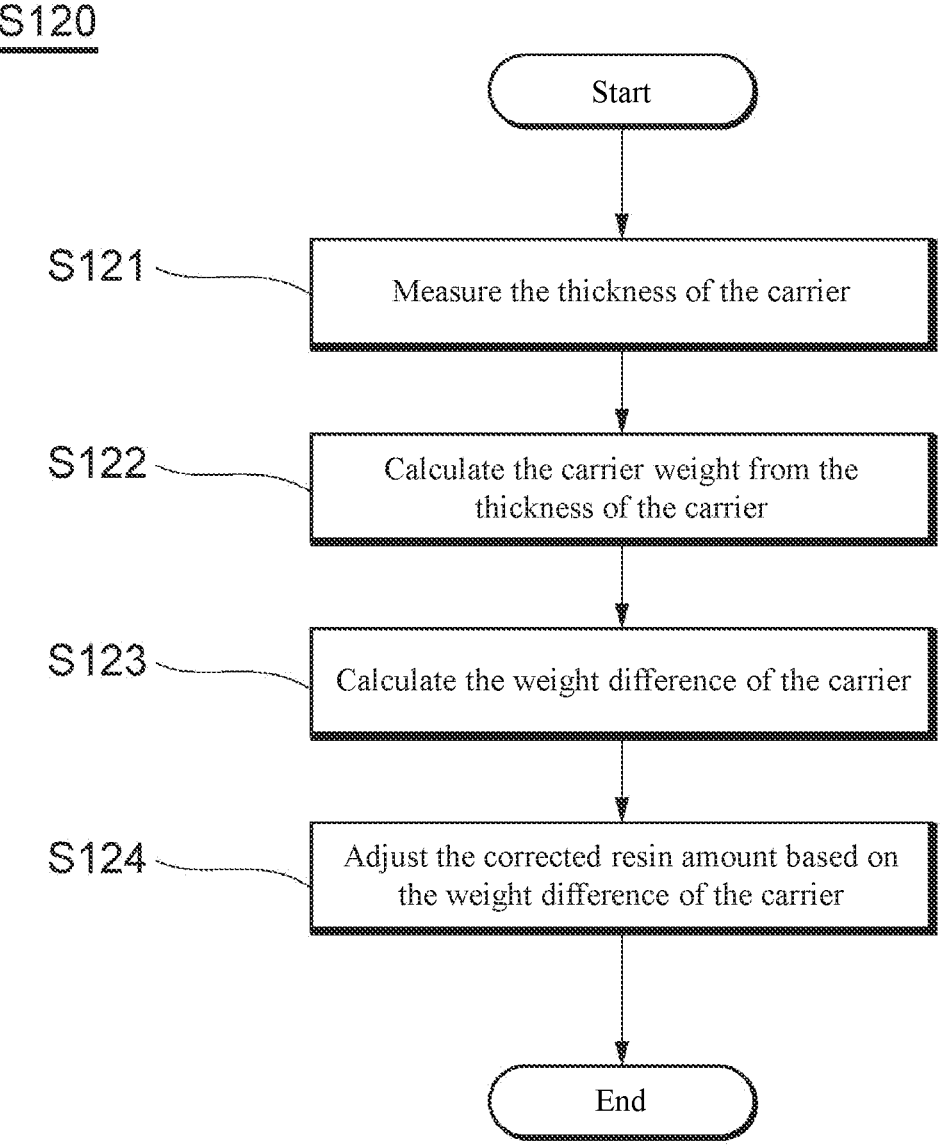
FIG. 4 is a flowchart showing an example of the method of adjusting the corrected resin amount.

FIG. 4 is a flowchart showing an example of a method (S120) of adjusting the corrected resin amount. In the method S120 of adjusting the corrected resin amount, first, the thickness of the carrier 11 is measured (S121). The thickness of the carrier 11 is measured by the thickness measurement part 150. Next, the carrier weight is calculated from the thickness of the carrier 11 (S122), the weight difference of the carrier 11 is calculated (S123), and the corrected resin amount is adjusted based on the weight difference of the carrier 11 (S124). The weight difference of the carrier 11 is calculated by the calculation part 120, and the corrected resin amount is adjusted by the calculation part 120. The weight difference of the carrier 11 is the difference between the weight occupied by the reference carrier in the reference workpiece weight and the measured weight occu-pied by the carrier 11 in the workpiece 10. The weight of the carrier 11 varies according to a variation in the thickness of the carrier 11. Therefore, the weight difference of the work-piece 10 calculated in step S113 includes not only the weight of the absent components 12 but also the weight difference of the carrier 11. However, a variation in the weight of the carrier 11 does not affect the supply amount of the resin R required to compression-mold a package with a desired thickness. Therefore, the supply amount of the resin R can be calculated more accurately by eliminating the influence of the weight difference of the carrier 11 from the corrected resin amount. In step S124, as an example, the corrected resin amount is calculated from the weight difference of the workpiece 10 and then the corrected resin amount is adjusted based on the weight difference of the carrier 11. However, the corrected resin amount may be calculated after subtracting the weight difference of the carrier 11 from the weight difference of the workpiece 10.

Figures 5, 6:
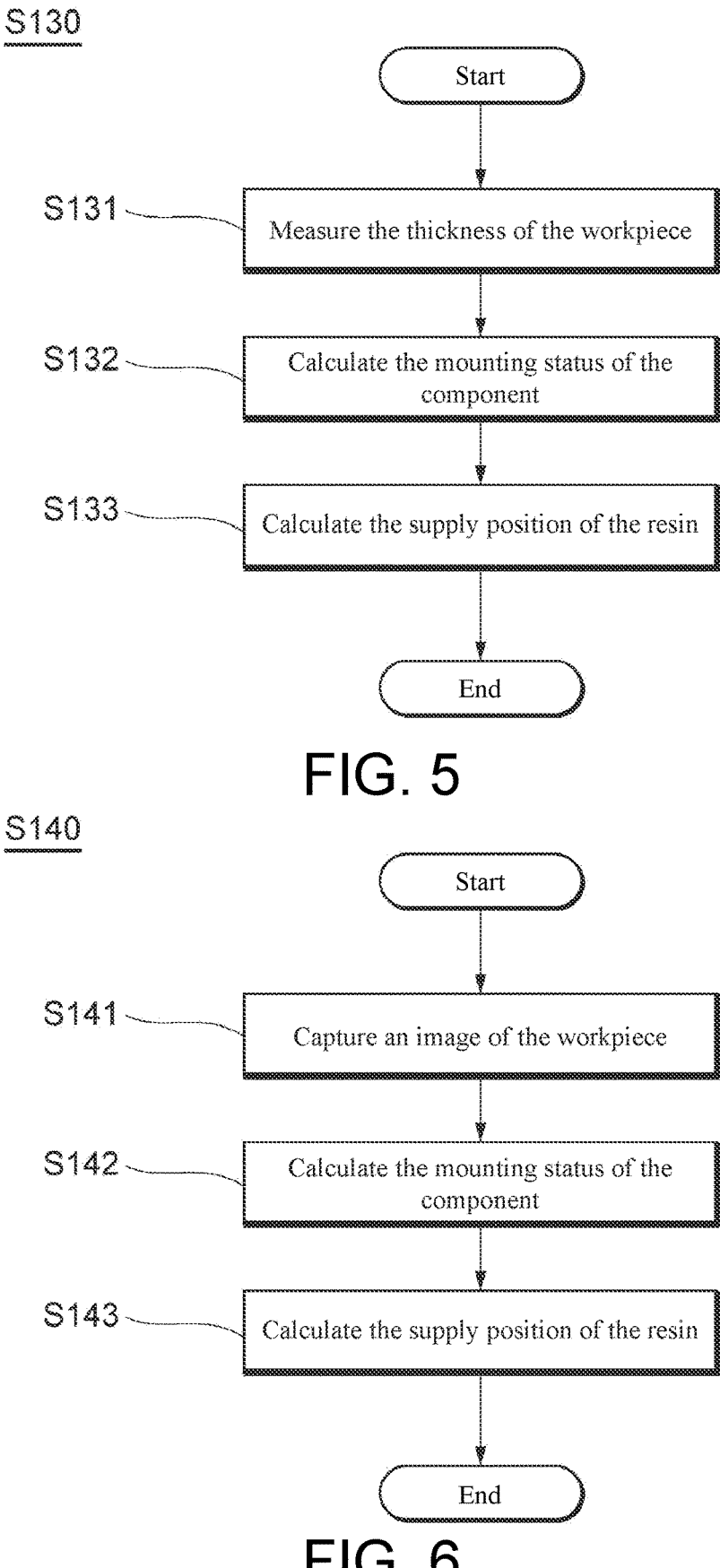
FIG. 5 is a flowchart showing an example of the method of calculating the supply position of resin.
FIG. 6 is a flowchart showing another example of the method of calculating the supply position of resin.

FIG. 5 is a flowchart showing an example of a method (S130) of calculating the supply position of the resin R. In the method S130 of calculating the supply position of the resin R, first, the thickness of the workpiece 10 is measured (S131). The thickness of the workpiece 10 is measured by the thickness measurement part 150. Next, the mounting status of the component 12 is calculated (S132), and the supply position of the resin R is calculated (S133). The mounting status of the component 12 is calculated by the calculation part 120 based on the thickness of the workpiece 10, and the supply position of the resin R is calculated by the calculation part 120 based on the mounting status of the component 12. The supply position of the resin R is calculated based on the mounting status of the component 12. By supplying more resin R to the positions corresponding to the second package area PA2 and the third package area PA3 than the resin R supplied to the position corresponding to the first package area PA1, the time required for filling the resin R inside the molding die 190 can be shortened to suppress molding defects of the resin R.

FIG. 6 is a flowchart showing another example of the method (S140) of calculating the supply position of the resin R. In the method S140 of calculating the supply position of the resin R, first, an image of the workpiece 10 is captured (S141). The image of the workpiece 10 is captured by the imaging part 160. Next, the mounting status of the component 12 is calculated (S142), and the supply position of the resin R is calculated (S143). The mounting status of the component 12 is calculated by the calculation part 120 based on the image of the workpiece 10, and the supply position of the resin R is calculated by the calculation part 120 based on the mounting status of the component 12. In addition, the calculation method S130 and the calculation method S140 may be used together to calculate the supply position of the resin R.

Figure 7:
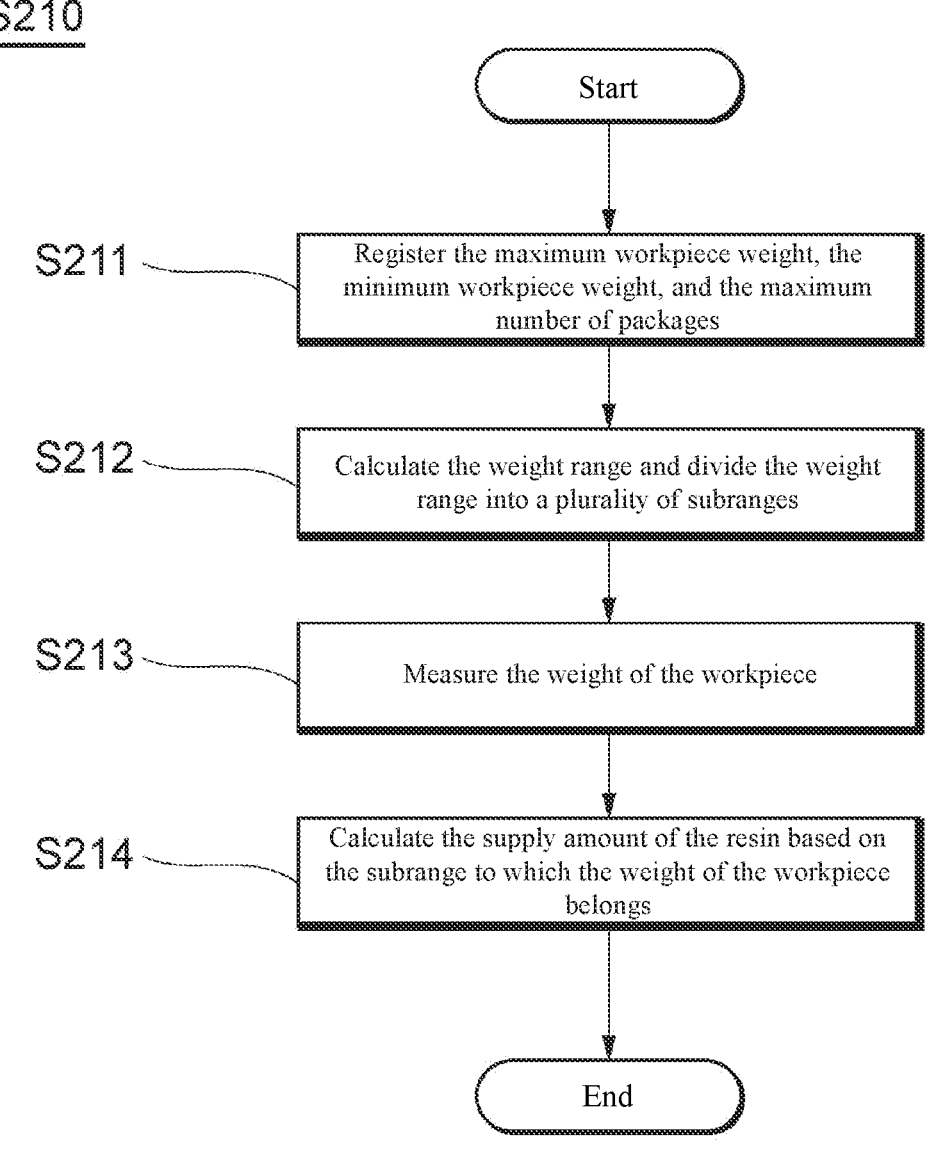
FIG. 7 is a flowchart showing another example of the method of calculating the supply amount of resin.

FIG. 7 is a flowchart showing another example of the method (S210) of calculating the supply amount of the resin R. In the method S210 of calculating the supply amount of the resin R, first, the maximum workpiece weight, the minimum workpiece weight, and the maximum number of packages are registered (S211). For example, the maximum workpiece weight, the minimum workpiece weight, and the maximum number of packages are input to the calculation part 120 from an external terminal. In this calculation method S210, the maximum workpiece weight is the weight of the workpiece 10 (hereinafter referred to as "maximum workpiece") with all the components 12 mounted on the reference carrier. In other words, the maximum workpiece weight is the weight of the workpiece 10 in which all the package areas PA are the first package areas PA1. Further, the minimum workpiece weight is the weight of the workpiece 10 (hereinafter referred to as "minimum workpiece") with no component 12 mounted on the reference carrier. In other words, the minimum workpiece weight is the weight of the reference carrier. The reference carrier is, for example, a carrier 11 with the standard weight. The maximum number of packages is the number of packages that can be manufactured from the maximum workpiece, that is, the number of package areas PA.

Next, a weight range is calculated and divided into a plurality of subranges (S212). The weight range is calculated by the calculation part 120 and the weight range is divided into the subranges by the calculation part 120. The weight range is a numerical range from the minimum workpiece weight to the maximum workpiece weight, and the subranges are numerical ranges obtained by dividing the weight range by the maximum number of packages.

Next, the weight of the workpiece 10 is measured (S213), and the supply amount of the resin R is calculated based on the subrange to which the weight of the workpiece 10 belongs (S214). The workpiece 10 is measured by the measuring part 110 and the supply amount of the resin R is calculated by the calculation part 120. For example, the calculation part 120 registers therein the supply amount of the resin R corresponding to each of the subranges, determines to which subrange the weight of the workpiece 10 belongs, and reads out the registered supply amount of the resin R. According to this, highly accurate measurement and calculation are not required, which improves the speed of calculating the supply amount of the resin R.

Modified examples of the compression molding device will be described below. It should be noted that matters common to the above-described embodiment are also applicable to the following modified examples and descriptions thereof will be omitted, and only the differences will be described. In particular, the same configurations are denoted by the same reference numerals, and the same configurations and the same effects resulting therefrom are not mentioned sequentially.

Figure 8:
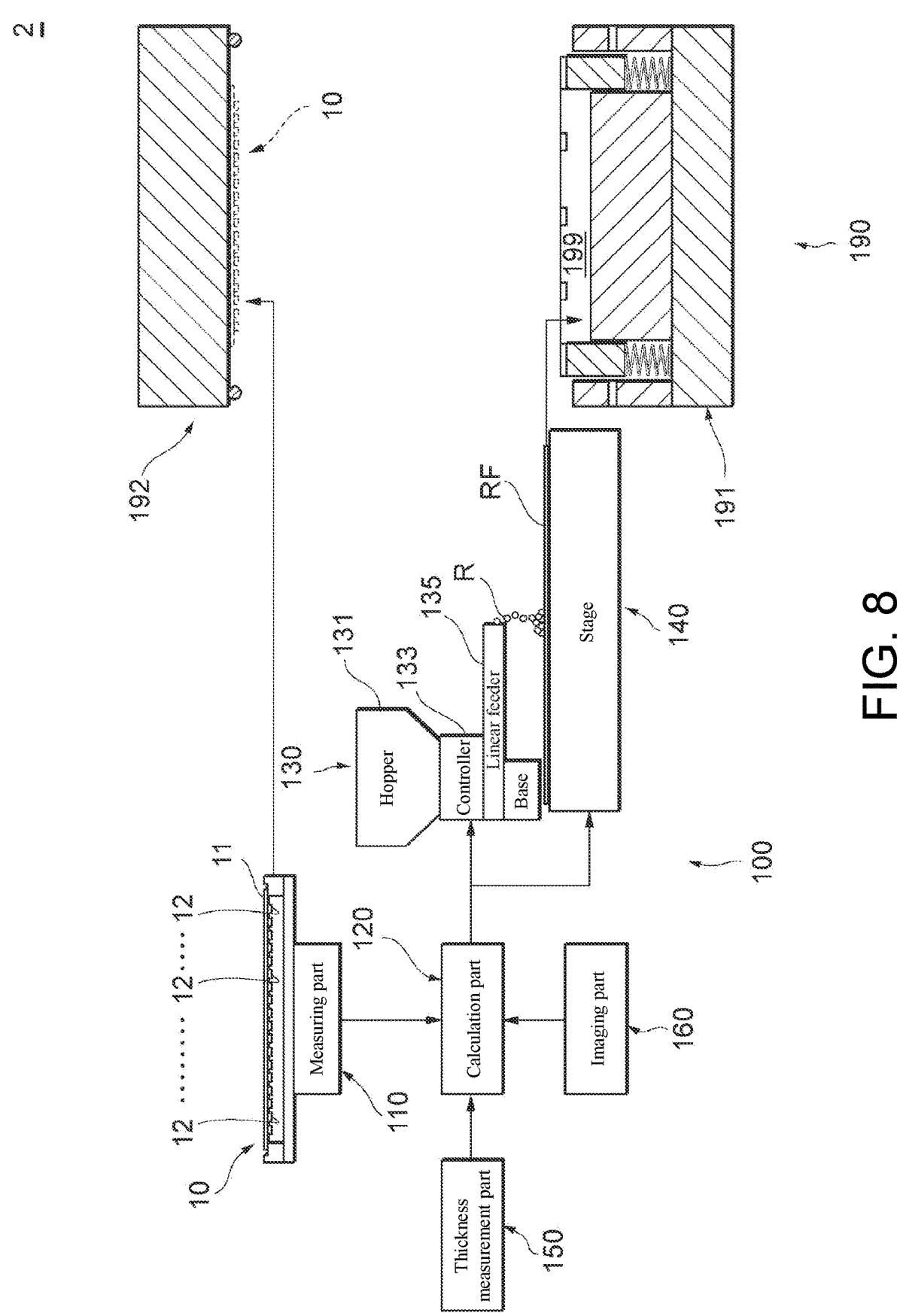
FIG. 8 is a diagram schematically showing the configuration of the compression molding device according to the first modified example.

The configuration of a compression molding device 2 according to a modified example will be described with reference to FIG. 8. FIG. 8 is a diagram schematically showing the configuration of the compression molding device according to the first modified example. In this modified example, the measuring part 110 measures the weight of the workpiece 10 with the components 12 facing downward (toward the side of the measuring part 110). The workpiece 10 is supported by the carrier 11 on the outer edge, and the components 12 are not in contact with the measuring part 110, etc. The workpiece 10 is transported in this orientation and set on the upper die 192 of the molding die 190.

Figure 9:
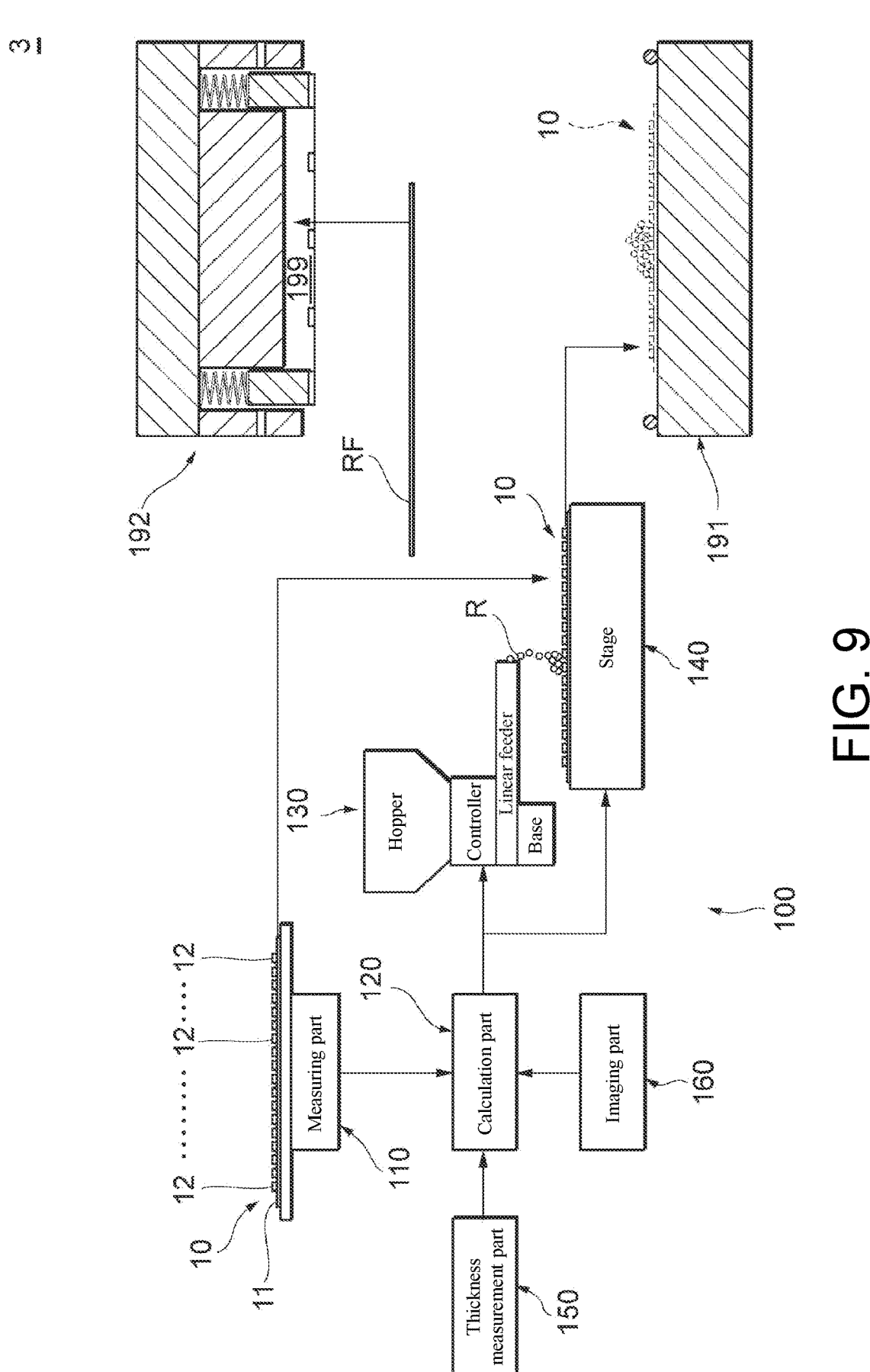
FIG. 9 is a diagram schematically showing the configuration of the compression molding device according to the second modified example.

The configuration of a compression molding device 3 according to a modified example will be described with reference to FIG. 9. FIG. 9 is a diagram schematically showing the configuration of the compression molding device according to the second modified example. In this modified example, the molding die 190 has an upper die cavity structure in which the upper die 192 has the cavity 199. The workpiece 10 measured by the measuring part 110 is transported to the stage 140. The workpiece 10 supplied with the resin R on the stage 140 is set on the lower die 191, and the release film RF is set on the upper die 192.

Figure 11:
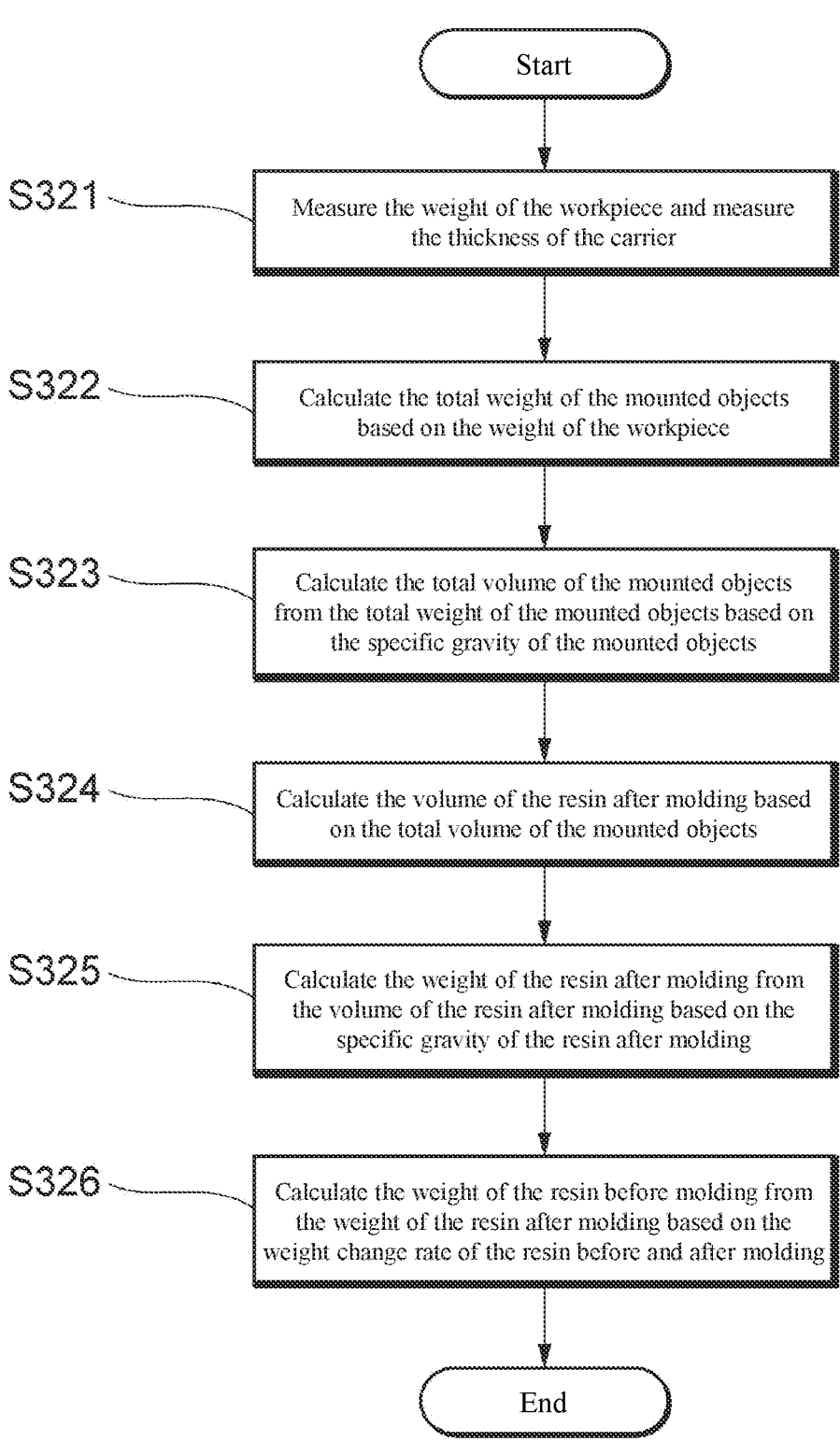
FIG. 11 is a flowchart showing a part of the method of calculating the supply amount of resin.

Next, an example of a method of calculating the supply amount of the resin according to an embodiment will be described with reference to FIG. 10 and FIG. 11. FIG. 10 and FIG. 11 are flowcharts showing a part of the method of calculating the supply amount of resin. FIG. 10 is a flowchart showing a trial stage, and FIG. 11 is a flowchart showing a production stage. In the following description, calculation is performed in the calculation part 120 unless otherwise specified.

First, the weights and volumes of a first trial workpiece and a second trial workpiece are measured (S311). The trial workpiece is a workpiece used for trial production to find out the manufacturing conditions for actual production. The first trial workpiece and the second trial workpiece are workpieces in which different numbers of sets of mounted objects are mounted on the reference carriers. It is preferable that the first trial workpiece and the second trial workpiece are appropriately selected from workpieces with none of the components 12 mounted thereon missing, but some of the components 12 may be missing. It is desirable that the numbers of sets of mounted objects of the first trial workpiece and the second trial workpiece differ greatly from each other. Preferably, the first trial workpiece is the minimum workpiece with no mounted object mounted thereon (that is, the reference carrier), and the second trial workpiece is the maximum workpiece with all the mounted objects mounted thereon.

The weight of the first trial workpiece is Ww1, the weight of the second trial workpiece is Ww2, the volume of the first trial workpiece is Vw1, and the volume of the second trial workpiece is Vw2. The weight Ww1 of the first trial workpiece and the weight Ww2 of the second trial workpiece are measured by the measuring part 110. In addition, the volume Vw1 of the first trial workpiece and the volume Vw2 of the second trial workpiece are directly measured by the volume measurement part. The volume Vw1 of the first trial workpiece and the volume Vw2 of the second trial workpiece may be calculated based on the thickness of the first trial workpiece and the thickness of the second trial workpiece measured by the thickness measurement part 150.

Next, the specific gravity of the mounted objects is calculated based on the weight difference and the volume difference of the trial workpiece (S312). The weight difference of the trial workpiece is the difference between the weight of the first trial workpiece and the weight of the second trial workpiece, and the volume difference of the trial workpiece is the difference between the volume of the first trial workpiece and the volume of the second trial workpiece. The specific gravity of the mounted objects is the combined specific gravity of a plurality of components and a plurality of connection members that connect the components to the carrier, that is, the specific gravity of the portion of the workpiece excluding the carrier.

The weight difference of the trial workpiece is $\Delta Ww21$, the volume difference of the trial workpiece is $\Delta Vw21$, and the specific gravity of the mounted objects is dm. $\Delta Ww21$ is calculated by the following equation $\Delta Ww21=Ww2-Ww1$. $\Delta Vw21$ is calculated by the following equation $\Delta Vw21=Vw2-Vw1$. dm is calculated by the following equation $dm=\Delta Ww21/\Delta Vw21$.

Next, the weight and volume of a first trial assembly package or a second trial assembly package are measured (S313). The first trial assembly package is a workpiece after molding, formed by molding a predetermined supply amount of resin to the first trial workpiece, and is an assembly of a plurality of packages manufactured based on the first trial workpiece. The second trial assembly package is a workpiece after molding, formed by molding a predetermined supply amount of resin to the second trial workpiece, and is an assembly of a plurality of packages manufactured based on the second trial workpiece.

The weight of the first trial assembly package is Wp1, the weight of the second trial assembly package is Wp2, the volume of the first trial assembly package is Vp1, and the volume of the second trial assembly package is Vp2. The weight Wp1 of the first trial assembly package or the weight Wp2 of the second trial assembly package is measured by the measuring part 110. In addition, the volume Vp1 of the first trial assembly package or the volume Vp2 of the second trial assembly package may be directly measured by the volume measurement part, or may be calculated based on the thickness of the first trial assembly package or the thickness of the second trial assembly package measured by the thickness measurement part 150. The weights Wp1 and Wp2 and the volumes Vp1 and Vp2 of both the first trial assembly package and the second trial assembly package may be measured.

The weight before molding of the resin supplied to the first trial workpiece for manufacturing the first trial assembly package is Wr1. The weight before molding of the resin supplied to the second trial workpiece for manufacturing the second trial assembly package is Wr2. The weights Wr1 and Wr2 of the resin may be measured values that are obtained after supply, or may be set values that are determined before supply.

Next, the specific gravity of the resin after molding is calculated based on the weight difference and the volume difference between the trial workpiece and the trial assembly package (S314). The weight difference between the trial workpiece and the trial assembly package is the difference between the weight of the trial workpiece before the resin is supplied and the weight of the trial workpiece after the resin is molded, and corresponds to the weight of the resin after molding in the trial assembly package. The same applies to the volume difference between the trial workpiece and the trial assembly package, which corresponds to the volume of the resin after molding in the trial assembly package. The specific gravity of the resin after molding is the specific gravity of the resin after molding in the trial assembly package.

The weight difference between the first trial workpiece and the first trial assembly package is $\Delta Wpw1$, the volume difference between the first trial workpiece and the first trial assembly package is $\Delta Vpw1$, the weight difference between the second trial workpiece and the second trial assembly package is $\Delta Wpw2$, the volume difference between the second trial workpiece and the second trial assembly package is $\Delta Vpw2$, and the specific gravity of the resin after molding is dr. $\Delta Wpw1$ is calculated by the following equation $\Delta Wpw1=Wp1-Ww1$. $\Delta Vpw1$ is calculated by the following equation $\Delta Vpw1=Vp1-Vw1$. $\Delta Wpw2$ is calculated by the following equation $\Delta Wpw2=Wp2-Ww2$. $\Delta Vpw2$ is calculated by the following equation $\Delta Vpw2=Vp2-Vw2$.

When the weight and volume of the first trial assembly package are measured in step S313, the weight difference and volume difference calculated in step S314 are $\Delta Wpw1$ and $\Delta Vpw1$, and dr is calculated by the following equation $V=\Delta Wpw1/\Delta Vpw1$. When the weight and volume of the second trial assembly package are measured in step S313, the weight difference and volume difference calculated in step S314 are $\Delta Wpw2$ and $\Delta Vpw2$, and dr is calculated by the following equation $dr=\Delta Wpw2/\Delta Vpw2$.

In addition, when the weights and volumes of both the first trial assembly package and the second trial assembly package are measured in step S313, the specific gravity of the resin after molding may be the average of the specific gravity calculated based on the weight and volume of the first trial assembly package and the specific gravity calculated based on the weight and volume of the second trial assembly package. At this time, dr is calculated by the following equation $dr=\{(\Delta Wpw1/\Delta Vpw1)+(\Delta Wpw2/\Delta Vpw2)\}/2$.

Next, the weight change rate of the resin before and after molding is calculated based on the weight difference between the trial workpiece and the trial assembly package (S315). The weight change rate of the resin before and after molding is the ratio of the weight of the resin after molding to the weight of the resin before molding.

The weight change rate of the resin before and after molding is a. When the weight and volume of the first trial assembly package are measured in step S313, $\alpha$ is calculated by the following equation $\alpha=\Delta Wpw1/Wr1$. When the weight and volume of the second trial assembly package are measured in step S313, $\alpha$ is calculated by the following equation $\alpha=\Delta Wpw2/Wr2$.

In addition, when the weights and volumes of both the first trial assembly package and the second trial assembly package are measured in step S313, the weight change rate of the resin before and after molding may be the average of the weight change rate of the resin supplied to the first trial workpiece and the weight change rate of the resin supplied to the second trial workpiece. At this time, $\alpha$ is calculated by the following equation $\alpha=((\Delta Wpw1/Wr1)+(\Delta Wpw2/Wr2))/2$.

Next, the weight of the workpiece 10 is measured and the thickness of the carrier 11 is measured (S321). The weight of the workpiece 10 is Ww and the thickness of the carrier 11 is Tc. The weight Ww of the workpiece 10 is measured by the measuring part 110 and the thickness Tc of the carrier 11 is measured by the thickness measurement part 150.

Here, the weight of the carrier 11 is calculated from the thickness Tc of the carrier 11. When the weight of the carrier 11 is Wc, the area of the carrier 11 is Sc, and the specific gravity of the carrier 11 is dc. We is calculated by the following equation $Wc=Tc \times Sc \times dc$. The area Sc and the specific gravity dc of the carrier 11 are registered in the calculation part 120 as set values. The area Sc of the carrier 11 may be a measured value.

Next, the total weight of the mounted objects is calculated based on the weight of the workpiece 10 (S322). The total weight of the mounted objects is the sum of the total weight of all the components 12 mounted on the workpiece 10 and the total weight of all the connection members that connect all the components 12 to the carrier 11. In other words, the total weight is the weight of the portion of the workpiece 10 excluding the carrier 11. When a part of one component 12 is missing, or when the number of components 12 and the number of connection members do not match, the total weight of the mounted objects calculated in step S322 may be calculated as a number that is not an integer multiple of the weight of the mounted objects per set.

When the total weight of the mounted objects is Wm. Wm is calculated by the following equation $Wm=Ww-Wc$.

Next, the total volume of the mounted objects is calculated from the total weight of the mounted objects based on the specific gravity of the mounted objects (S323). The total volume of the mounted objects is the sum of the total volume of all the components 12 mounted on the workpiece 10 and the total volume of all the connection members that connect all the components 12 to the carrier 11. In other words, the total volume is the volume of the portion of the workpiece 10 excluding the carrier 11. Similar to the total weight of the mounted objects, the total volume of the mounted objects may be calculated as a number that is not an integer multiple of the volume of the mounted objects per set.

When the total volume of the mounted objects is Vm. Vm is calculated by the following equation $Vm=Wm \times dm$.

Next, the volume of the resin after molding is calculated based on the total volume of the mounted objects (S324). The volume of the resin after molding is the volume of the resin after molding in the assembly package, and is the volume of the portion of the assembly package excluding the workpiece 10.

The volume of the cavity 199 is Vcv, and the volume of the resin after molding is Vrc. Vrc is calculated by the following equation $Vrc=Vcv-Vm$. The volume Vcv of the cavity 199 is designed in advance according to the target dimensions of the assembly package and registered in the calculation part 120 as a set value.

Next, the weight of the resin after molding is calculated from the volume of the resin after molding based on the specific gravity of the resin after molding (S325). The weight of the resin after molding is the weight of the resin after molding in the assembly package, and is the weight of the portion of the assembly package excluding the workpiece 10.

When the weight of the resin after molding is Wrc. Wrc is calculated by the following equation $Wrc=Vrc \times dr$.

Next, the weight of the resin before molding is calculated from the weight of the resin after molding based on the weight change rate of the resin before and after molding (S326). The calculated weight of the resin before molding is treated as an appropriate supply amount of the resin for the workpiece 10.

When the weight of the resin before molding is Wr, Wr is calculated by the following equation $Wr=(1/\alpha) \times Wrc$.

Thus, in this embodiment, the total weight of the mounted objects is calculated based on the weight of the workpiece, the total volume of the mounted objects is calculated from the total weight of the mounted objects based on the specific gravity of the mounted objects, and the supply amount of the resin is calculated based on the total volume of the mounted objects. The specific gravity of the mounted objects is calculated by dividing the weight difference between the weight of the first trial workpiece and the weight of the second trial workpiece by the volume difference between the volume of the first trial workpiece and the volume of the second trial workpiece.

Accordingly, it is possible to calculate the supply amount of the resin in consideration of not only the quantity of components but also the quantity of connection members. Thus, the accuracy in calculating the supply amount of the resin can be improved to suppress the occurrence of defective products due to excess or deficiency of resin.

Furthermore, in this embodiment, the minimum workpiece with no mounted object mounted on the reference carrier may be the first trial workpiece, and the maximum workpiece with all the mounted objects mounted on the reference carrier may be the second trial workpiece.

Accordingly, the weight difference and volume difference between the first trial workpiece and the second trial workpiece are increased, which improves the accuracy in calculating the specific gravity of a plurality of mounted objects.

Further, in this embodiment, the weight of the mounted objects is calculated by subtracting the weight of the carrier calculated based on the thickness of the carrier from the weight of the workpiece.

Accordingly, calculation errors of the resin supply amount caused by a variation in the thickness of the carrier can be reduced.

However, the total weight of the mounted objects may also be calculated by subtracting the weight of the reference carrier from the weight of the workpiece. In this case, the weight of the reference carrier is registered in the calculation part as a set value, so it is possible to omit measurement of the thickness of the carrier in the measuring part included in step S321, which simplifies the manufacturing process.

Besides, in this embodiment, the volumes of the first trial workpiece and the second trial workpiece are directly measured by the volume measurement part, and the volume difference between the volume of the first trial workpiece and the volume of the second trial workpiece is calculated based on the result of measurement in the volume measurement part.

Accordingly, the configuration of this embodiment shortens the time required to calculate the specific gravity of the mounted objects, compared to a configuration that calculates the volumes of the first trial workpiece and the second trial workpiece based on the thickness measured by the thickness measurement part.

Further, in this embodiment, the weight of the resin before molding is calculated, as an appropriate supply amount of the resin for the workpiece, from the weight of the resin after molding based on the weight change rate of the resin before and after molding.

Accordingly, calculation errors of the resin supply amount caused by a change in the weight of the resin before and after molding can be reduced.

However, the weight of the resin after molding may be calculated as an appropriate supply amount of the resin for the workpiece based on the volume of the resin after molding.

Accordingly, step S315 and step S326 may be omitted to simplify the manufacturing process.

Although the manufacturing conditions (specific gravity of a plurality of mounted objects, specific gravity of resin after molding, weight change rate of resin before and after molding, etc.) are calculated based on two trial workpieces in this embodiment, the manufacturing conditions may be calculated based on three or more trial workpieces. By increasing the number of trial workpieces, the accuracy of the manufacturing conditions can be improved.

Figure 12:
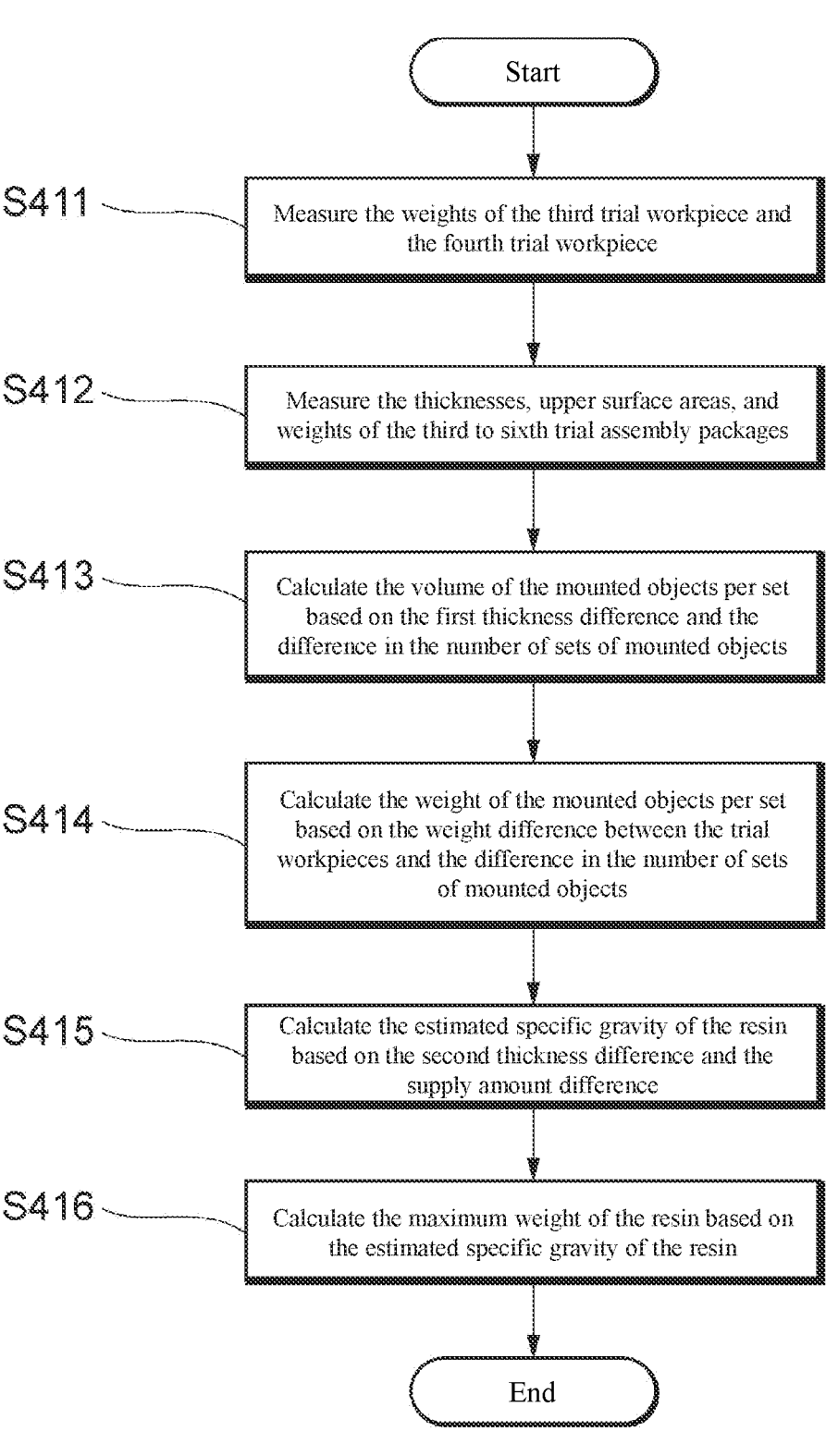
FIG. 12 is a flowchart showing a part of the method of calculating the supply amount of resin.
Figure 13:
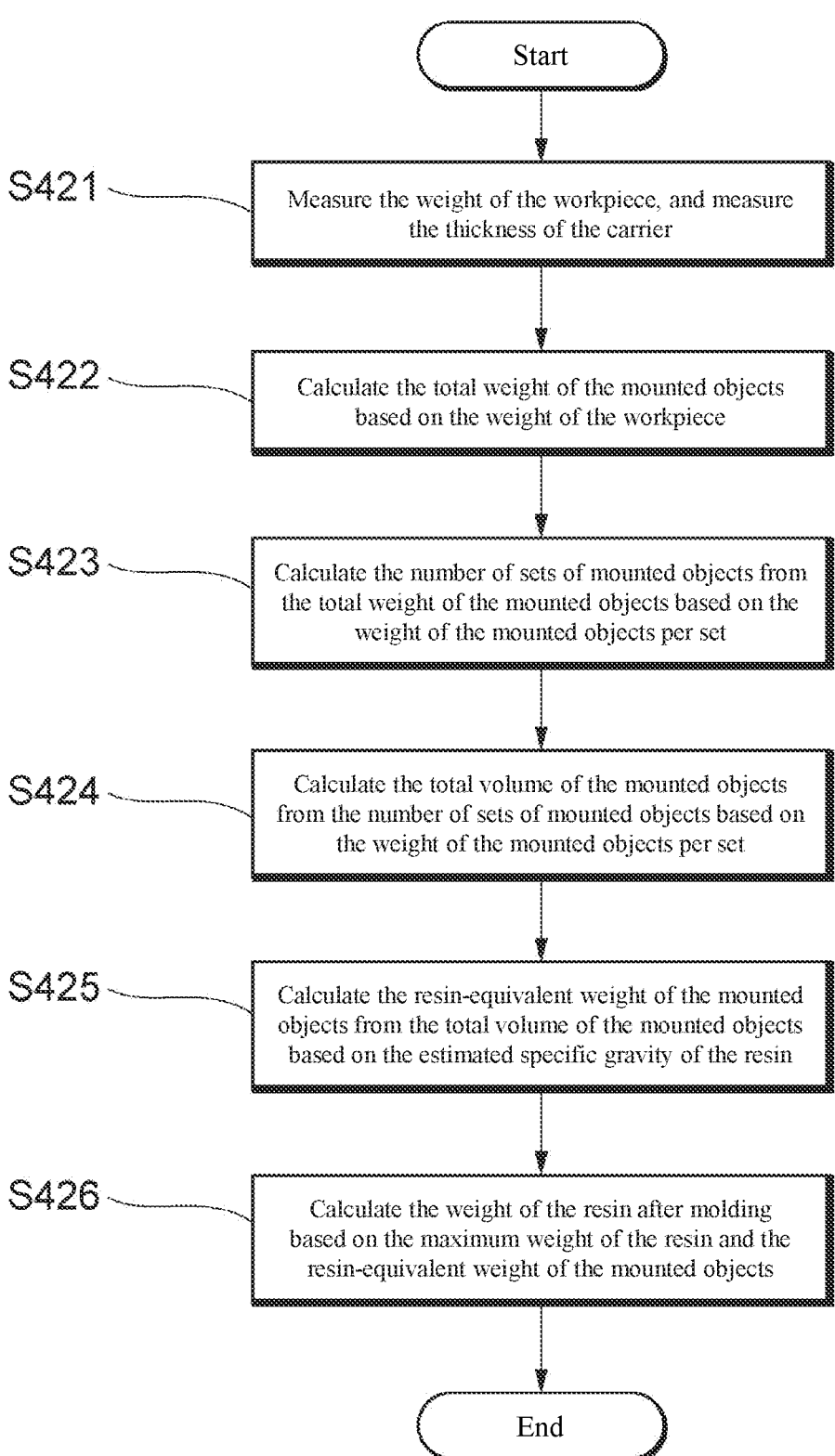
FIG. 13 is a flowchart showing a part of the method of calculating the supply amount of resin.

Next, an example of a method of calculating the supply amount of resin according to an embodiment will be described with reference to FIG. 12 and FIG. 13. FIG. 12 and FIG. 13 are flowcharts showing a part of the method of calculating the supply amount of resin. FIG. 12 is a flowchart showing the trial stage, and FIG. 13 is a flowchart showing the production stage. In the following description, details of steps similar to those described with reference to FIG. 10 and FIG. 11 will be omitted.

First, the weights of a third trial workpiece and a fourth trial workpiece are measured (S411). The third trial workpiece and the fourth trial workpiece are workpieces with different numbers of sets of mounted objects mounted on the reference carrier. The third trial workpiece and the fourth trial workpiece are appropriately selected from workpieces with none of the mounted components 12 missing. Therefore, the number of mounted components 12 and the number of sets of mounted objects in the third trial workpiece and the fourth trial workpiece match. It is desirable that the number of sets of mounted objects of the third trial workpiece and the number of sets of mounted objects of the fourth trial workpiece differ greatly from each other. Preferably, the third trial workpiece is the minimum workpiece with no mounted object mounted thereon (that is, the reference carrier), and the fourth trial workpiece is the maximum workpiece with all the mounted objects mounted thereon.

The weight of the third trial workpiece is Ww3, and the weight of the fourth trial workpiece is Ww4. The weight Ww3 of the third trial workpiece and the weight Ww4 of the fourth trial workpiece are measured by the measuring part 110. The number of sets of mounted objects mounted on the third trial workpiece is Nw3, and the number of sets of mounted objects mounted on the fourth trial workpiece is Nw4. The numbers Nw3 and Nw4 of sets of mounted objects mounted on the third trial workpiece and the fourth trial workpiece are, for example, proportional to the number of components 12 counted by thickness measurement and image analysis performed on the third trial workpiece and the fourth trial workpiece, but Nw3 and Nw4 may be predetermined set values registered in the calculation part 120. One of the numbers Nw3 and Nw4 of sets of mounted objects mounted on the third trial workpiece and the fourth trial workpiece may be zero.

Next, the thicknesses, upper surface areas, and weights of the third to sixth trial assembly packages are measured (S412). The third trial assembly package is a workpiece after molding, formed by molding a first supply amount of resin to the third trial workpiece, and is an assembly of a plurality of packages manufactured based on the third trial workpiece. The fourth trial assembly package is a workpiece after molding, formed by molding the first supply amount of resin to the fourth trial workpiece, and is an assembly of a plurality of packages manufactured based on the fourth trial workpiece. The fifth trial assembly package is a workpiece after molding, formed by molding a second supply amount of resin to the third trial workpiece, and is an assembly of a plurality of packages manufactured based on the third trial workpiece. The sixth trial assembly package is a workpiece after molding, formed by molding the second supply amount of resin to the fourth trial workpiece, and is an assembly of a plurality of packages manufactured based on the fourth trial workpiece. The first and second trial assembly packages described in the claims of the present application are, for example, the third and fourth trial assembly packages.

The weight of the first supply amount of resin before molding is Wra. and the weight of the second supply amount of resin before molding Wrb. The weight Wra of the first supply amount of resin before molding and the weight Wrb of the second supply amount of resin before molding may be measured values obtained by the measuring part 110, for example, after supply and before molding, or may be set values that are determined before supply.

The thickness of the trial assembly package is the average value of the thickness of the portion where the upper surface is flat when the carrier side of the trial assembly package is the lower surface and the resin side is the upper surface. The upper surface area of the trial assembly package is the area of the portion where the upper surface is flat. However, the thickness of the trial assembly package may be the maximum value or minimum value of the thickness of the portion where the upper surface is flat, or may be the thickness at a specific position such as the center.

The thickness of the third trial assembly package is Tp3, the thickness of the fourth trial assembly package is Tp4, the thickness of the fifth trial assembly package is Tp5, and the thickness of the sixth trial assembly package is Tp6. The thicknesses Tp3 to Tp6 of the third to sixth trial assembly packages are measured by the thickness measurement part 150. If at least three of the thicknesses Tp3 to Tp6 of the third to sixth trial assembly packages are measured, the measurement for the remaining one may be omitted. When the upper surface area is Sp, the upper surface area Sp may be obtained by measuring the upper surface area of any one of the third to sixth trial assembly packages, or the upper surface areas of two or more of the third to sixth trial assembly packages may be measured to calculate an average. The upper surface area Sp may be the area of the flat bottom surface of the cavity 199 registered as a set value in the calculation part 120. The weight of the third trial assembly package is Wp3, the weight of the fourth trial assembly package is Wp4, the weight of the fifth trial assembly package is Wp5, and the weight of the sixth trial assembly package is Wp6. The weights Wp3 to Wp6 of the third to sixth trial assembly packages are measured by the measuring part 110, for example. If at least one of the weights Wp3 to Wp6 of the third to sixth trial assembly packages is measured, the measurement for the remaining three may be omitted.

Next, the volume of the mounted objects per set is calculated based on the first thickness difference and the difference in the number of sets of mounted objects (S413). The first thickness difference is a difference in thickness that occurs when the same supply amount of resin is molded to two workpieces with different numbers of sets of mounted objects mounted thereon, and correlates with the difference in the number of sets of mounted objects. The difference in the number of sets of mounted objects is the difference between the number Nw3 of sets of the mounted objects mounted on the third trial workpiece and the number Nw4 of sets of the mounted objects mounted on the fourth trial workpiece. The volume of the mounted objects per set is the sum of the volume of a component 12 that is not missing and is mounted in one package area and the volume of a connection member that is not missing and connects the component 12 to the carrier 11.

The first thickness difference is $\Delta T1$, the difference in the number of sets of mounted objects is $\Delta Nw43$, and the volume of the mounted objects per set is Vs.

When the measurement for either the thickness Tp5 of the fifth trial assembly package or the thickness Tp6 of the sixth trial assembly package is omitted in step S412, the first thickness difference $\Delta T1$ is the difference between the thickness Tp4 of the fourth trial assembly package and the thickness Tp3 of the third trial assembly package. At this time, $\Delta T1$ is calculated by the following equation $\Delta T1=|Tp4-Tp3|$. If the measurement for either the thickness Tp3 of the third trial assembly package or the thickness Tp4 of the fourth trial assembly package is omitted in step S412, the first thickness difference $\Delta T1$ is the difference between the thickness Tp6 of the sixth trial assembly package and the thickness Tp5 of the fifth trial assembly package. At this time, $\Delta T1$ is calculated by the following equation $\Delta T1=|Tp6-Tp5|$. When all the thicknesses Tp3 to Tp6 of the third to sixth trial assembly packages are measured in step S412, the first thickness difference $\Delta T1$ may be the average of the thickness difference between the fourth trial assembly package and the third trial assembly package and the thickness difference between the sixth trial assembly package and the fifth trial assembly package. At this time, $\Delta T1$ is calculated by the following equation $\Delta T1=(|Tp4-Tp3|+|Tp6-Tp5|)/2$.

$\Delta Nw43$ is calculated by the following equation $\Delta Nw43=|Nw4-Nw3|$. For example, when the third trial workpiece is the minimum workpiece (Nw=0), the number of sets of mounted objects mounted on the fourth trial workpiece is the difference in the number of sets ($\Delta Nw43=Nw4$). In addition, since the third and fourth trial workpieces are selected from workpieces with none of the mounted components 12 missing, Nw3 and Nw4 are 0 or positive integers, and $\Delta Nw43$ is a positive integer.

Vs is calculated by the following equation $Vs=(\Delta T1\times Sp)/\Delta Nw43$.

Next, the weight of the mounted objects per set is calculated based on the weight difference between the trial workpieces and the difference in the number of sets of mounted objects (S414). The weight difference between the trial workpieces is the difference between the weight Ww4 of the fourth trial workpiece and the weight Ww3 of the third trial workpiece, and corresponds to the total weight of the mounted objects of the difference $\Delta Nw43$ in the number of sets. The weight of the mounted objects per set is the sum of the weight of a component 12 that is not missing and is mounted in one package area and the weight of a connection member that is not missing and connects the component 12 to the carrier 11.

The weight difference between the trial workpieces is $\Delta Ww43$, and the weight of the mounted objects per set is Ws. $\Delta Ww43$ is calculated by the following equation $\Delta Ww43=|Ww4-Ww3|$. Ws is calculated by the following equation $Ws=\Delta Ww43/\Delta Nw43$.

Next, the estimated specific gravity of the resin is calculated based on the second thickness difference and the supply amount difference (S415). The second thickness difference is a difference in thickness that occurs when different supply amounts of resin are supplied to two workpieces with the same number of sets of mounted objects mounted thereon, and correlates with the volume of the resin after molding. The supply amount difference is the difference between the weight Wra of the first supply amount of resin before molding and the weight Wrb of the second supply amount of resin before molding. The estimated specific gravity of the resin is the specific gravity of the resin calculated on the assumption that the weight of the resin is substantially constant before and after molding.

The second thickness difference is $\Delta T2$, the supply amount difference is $\Delta Wr$, and the estimated specific gravity of the resin is drx.

When the measurement for either the thickness Tp4 of the fourth trial assembly package or the thickness Tp6 of the sixth trial assembly package is omitted in step S412, the second thickness difference $\Delta T2$ is the difference between the thickness Tp5 of the fifth trial assembly package and the thickness Tp3 of the third trial assembly package. At this time, $\Delta T2$ is calculated by the following equation $\Delta T2=|Tp5-Tp3|$. When the measurement for either the thickness Tp3 of the third trial assembly package or the thickness Tp5 of the fifth trial assembly package is omitted in step S412, the second thickness difference $\Delta T2$ is the difference between the thickness Tp6 of the sixth trial assembly package and the thickness Tp4 of the fourth trial assembly package. At this time, $\Delta T2$ is calculated by the following equation $\Delta T2=rTp6-Tp4|$. When all the thicknesses Tp3 to Tp6 of the third to sixth trial assembly packages are measured in step S412, the second thickness difference $\Delta T2$ may be the average of the thickness difference between the fifth trial assembly package and the third trial assembly package and the thickness difference between the sixth trial assembly package and the fourth trial assembly package. At this time, $\Delta T2$ is calculated by the following equation $\Delta T2=(|Tp5-Tp3|+|Tp6-Tp4|)/2$.

$\Delta Wr$ is calculated by the following equation $\Delta Wr=|Wrb-Wra|$.

drx is calculated by the following equation $drx=\Delta Wr/(\Delta T2\times Sp)$.

Next, the maximum weight of the resin is calculated based on the estimated specific gravity of the resin (S416). The maximum weight of the resin is the weight of resin required to be supplied in order to manufacture an assembly package with target dimensions for the minimum workpiece with no component mounted thereon (that is, reference carrier).

The maximum weight of the resin is Wrm, and the target thickness of the assembly package registered in the calculation part 120 as a set value is Tpt. When the third trial workpiece is a reference carrier, the maximum weight Wrm of the resin can be obtained by correcting the weight difference between the weight of the trial assembly package manufactured from the third trial workpiece and the target weight of the assembly package, with respect to the weight of the resin supplied to the third trial workpiece. At this time. Wrm is calculated by the following equation $Wrm=Wra-\{(Tp3-Tpt)\times Sp/drx\}$ or by the following equation $Wrm=Wrb-\{(Tp5-Tpt)\times Sp/drx\}$.

When the thickness of the reference carrier is registered in the calculation part 120 as a set value, with the thickness of the reference carrier as Tcs, Wrm can also be calculated by the following equation $Wrm=(Tpt-Tcs)\times Sp/drx$. In addition, in the above equations for calculating Wrm, a measured value obtained by measuring the thickness of the carrier included in the third trial workpiece or the fourth trial workpiece may be used instead of Tcs which is a set value of the thickness of the reference carrier.

Next, the weight of the workpiece 10 is measured and the thickness of the carrier 11 is measured (S421). The weight of the workpiece 10 is Ww and the thickness of the carrier 11 is Tc. Further, the weight We of the carrier 11 is calculated from the thickness Tc of the carrier 11.

Next, the total weight of the mounted objects is calculated based on the weight of the workpiece (S422). The total weight of the mounted objects is Wm.

Next, the number of sets of mounted objects is calculated from the total weight of the mounted objects based on the weight of the mounted objects per set (S423). The number of sets of mounted objects is the total number of sets of the mounted objects mounted on the workpiece 10. When a part of one component 12 is missing, or when the number of components 12 and the number of connection members do not match, the number of sets of mounted objects may be calculated as a number that is not an integer.

When the number of sets of mounted objects is Nm, Nm is calculated by the following equation Nm=Wm/Ws.

Next, the total volume of the mounted objects is calculated from the number of sets of mounted objects based on the weight of the mounted objects per set (S424).

When the total volume of the mounted objects is Vm, Vm is calculated by the following equation Vm=Nm×Vs.

Next, a resin-equivalent weight of the mounted objects is calculated from the total volume of the mounted objects based on the estimated specific gravity of the resin (S425). The resin-equivalent weight of the mounted objects is the weight when the mounted objects in the workpiece 10 are replaced with molded resin. In other words, the resin-equivalent weight is the weight of the resin after molding, which has the same volume as the total volume of the mounted objects.

When the resin-equivalent weight of the mounted objects is Wrx, Wrx is calculated by the following equation Wrx=Vm×drx.

Next, the weight of the resin after molding is calculated based on the maximum weight of the resin after molding and the resin-equivalent weight of the mounted objects (S426).

When the weight of the resin after molding is Wrc. Wrc is calculated by the following equation Wrc=Wrm−Wrx. The calculated weight Wrc of the resin after molding is treated as an appropriate supply amount of the resin for the workpiece 10.

Thus, in this embodiment, the total weight of the mounted objects is calculated based on the weight of the workpiece, the number of sets of mounted objects is calculated from the total weight of the mounted objects based on the weight of the mounted objects per set, the total volume of the mounted objects is calculated from the number of sets of mounted objects based on the volume of the mounted objects per set, and the supply amount of the resin is calculated based on the total volume of the mounted objects. The volume of the mounted objects per set is, for example, calculated by multiplying the thickness difference between the thickness of the third trial assembly package and the thickness of the fourth trial assembly package by the upper surface area of the third or fourth trial assembly package, and dividing the product by the difference in the number of sets between the number of sets of mounted objects of the third trial workpiece and the number of sets of mounted objects of the fourth trial workpiece. The weight of the mounted objects per set is, for example, calculated by dividing the weight difference between the weight of the third trial workpiece and the weight of the fourth trial workpiece by the difference in the number of sets between the number of sets of mounted objects of the third trial workpiece and the number of sets of mounted objects of the fourth trial workpiece.

Accordingly, it is possible to calculate the supply amount of the resin in consideration of not only the quantity of components but also the quantity of connection members. Thus, the accuracy in calculating the supply amount of the resin can be improved to suppress the occurrence of defective products due to excess or deficiency of resin.

Furthermore, in this embodiment, the minimum workpiece with no mounted object mounted on the reference carrier may be the third trial workpiece, and the maximum workpiece with all the mounted objects mounted on the reference carrier may be the fourth trial workpiece.

Accordingly, the thickness difference between the third trial assembly package and the fourth trial assembly package and the difference in the number of sets of mounted objects between the third trial workpiece and the fourth trial workpiece are increased, which improves the accuracy in calculating the volume of the mounted objects per set. In addition, the weight difference between the third trial workpiece and the fourth trial workpiece is also increased to improve the accuracy in calculating the weight of the mounted objects per set.

Further, in this embodiment, the weight of the mounted objects is calculated by subtracting the weight of the carrier calculated based on the thickness of the carrier from the weight of the workpiece.

Accordingly, calculation errors of the resin supply amount caused by a variation in the thickness of the carrier can be reduced.

However, the weight of the mounted objects may be calculated by subtracting the weight of the reference carrier from the weight of the workpiece. In this case, the weight of the reference carrier is registered in the calculation part as a set value, so it is possible to omit measurement of the thickness of the carrier in the measuring part included in step S321, which simplifies the manufacturing process.

Besides, in this embodiment, the estimated specific gravity of the resin is calculated by dividing the weight of the resin before molding by the volume of the resin after molding, the maximum weight of the resin is calculated based on the estimated specific gravity of the resin, and the weight of the resin after molding is calculated based on the maximum weight of the resin.

Nevertheless, the method of calculating the maximum weight Wrm of the resin is not limited to the above. For example. Wrm may be calculated by the following equation Wrm=Wrb−{(Tp5−Tpt)×Sp/drc} where drc is the specific gravity of the resin after molding. When the weight difference between the weight Wp5 of the fifth trial assembly package and the weight Wp3 of the third trial assembly package is ΔWp53, drc is calculated by the following equation drc=ΔWp53/(ΔT2×Sp).

The maximum weight Wrm of the resin may be calculated by multiplying the capacity of the cavity 199 registered in the calculation part 120 as a design value by the estimated specific gravity of the resin or the specific gravity of the molding resin.

Further, in this embodiment, the weight of the resin after molding is calculated as an appropriate supply amount of the resin for the workpiece.

However, it is also possible to calculate the weight change rate of the resin before and after molding and calculate the weight of the resin before molding from the weight Wrc of the resin after molding, and treat it as an appropriate supply amount of the resin for the workpiece. The weight change rate of the resin before and after molding is, for example, calculated by dividing the weight difference between the weight Wp5 of the fifth trial assembly package and the weight Wp3 of the third trial assembly package by the weight difference between the weight of the second supply amount of resin and the weight of the first supply amount of resin.

As described above, one aspect of the present invention can provide a compression molding device that is capable of improving the accuracy of resin supply.

The embodiments described above are provided for facilitating understanding of the present invention, and are not intended to limit and interpret the present invention. Each element included in the embodiment and its arrangement, material, conditions, shape, size, etc. are not limited to those illustrated and can be changed as appropriate. Moreover, it is possible to partially replace or combine the configurations shown in different embodiments.

What is claimed is:

1. A compression molding device for compression-molding resin to a workpiece, in which a plurality of components are mounted on a carrier via a plurality of connection members, and manufacturing a plurality of packages each having at least one of the components sealed with the resin, the compression molding device comprising:

a measuring part measuring a weight of the workpiece;

a calculation part calculating a supply amount of the resin based on the weight of the workpiece measured by the measuring part;

a supply part supplying the resin in the supply amount calculated by the calculation part;

a volume measurement part measuring a volume of the workpiece; and a molding die compression-molding the resin supplied by the supply part to the workpiece, wherein the calculation part calculates a total volume of a plurality of mounted objects, which comprise the plurality of components and the plurality of connection members, based on the weight of the workpiece, and calculates the supply amount of the resin based on the total volume of the plurality of mounted objects, wherein the calculation part calculates a total weight of the plurality of mounted objects based on the weight of the workpiece, and calculates the total volume of the plurality of mounted objects from the total weight of the plurality of mounted objects based on a specific gravity of the plurality of mounted objects, wherein the measuring part measures a weight of a first trial workpiece in which a first number of sets of mounted objects are mounted on a reference carrier, and a weight of a second trial workpiece in which a second number of sets of mounted objects are mounted on the reference carrier, the second number of sets being different from the first number of sets, wherein the volume measurement part measures a volume of the first trial workpiece and a volume of the second trial workpiece, and the calculation part calculates the specific gravity of the plurality of mounted objects by dividing a weight difference between the weight of the first trial workpiece and the weight of the second trial workpiece by a volume difference between the volume of the first trial workpiece and the volume of the second trial workpiece.

2. A compression molding device for compression-molding resin to a workpiece, in which a plurality of components are mounted on a carrier via a plurality of connection members, and manufacturing a plurality of packages each having at least one of the components sealed with the resin, the compression molding device comprising:

a measuring part measuring a weight of the workpiece;

a calculation part calculating a supply amount of the resin based on the weight of the workpiece measured by the measuring part;

a supply part supplying the resin in the supply amount calculated by the calculation part;

a thickness measurement part measuring a thickness of the package; and a molding die compression-molding the resin supplied by the supply part to the workpiece, wherein the calculation part calculates a total volume of a plurality of mounted objects, which comprise the plurality of components and the plurality of connection members, based on the weight of the workpiece, and calculates the supply amount of the resin based on the total volume of the plurality of mounted objects, wherein the calculation part calculates a total weight of the plurality of mounted objects based on the weight of the workpiece, and calculates the total volume of the plurality of mounted objects based on the total weight of the plurality of mounted objects, wherein the calculation part calculates a number of sets of the plurality of mounted objects from the total weight of the plurality of mounted objects based on a weight of mounted objects per set, and calculates the total volume of the plurality of mounted objects from the number of sets of the plurality of mounted objects based on a volume of mounted objects per set, wherein the measuring part measures a weight of a first trial workpiece in which a first number of sets of mounted objects are mounted on a reference carrier, and a weight of a second trial workpiece in which a second number of sets of mounted objects are mounted on the reference carrier, the thickness measurement part measures a thickness of a first trial assembly package in which a first supply amount of resin is molded to the first trial workpiece, and a thickness of a second trial assembly package in which the first supply amount of resin is molded to the second trial workpiece, and the calculation part calculates the volume of mounted objects per set by multiplying a thickness difference between the thickness of the first trial assembly package and the thickness of the second trial assembly package by an upper surface area of the first trial assembly package or the second trial assembly package, and dividing an obtained product by a difference in the number of sets between the first number of sets and the second number of sets, and calculates the weight of mounted objects per set by dividing a weight difference between the weight of the first trial workpiece and the weight of the second trial workpiece by the difference in the number of sets.

3. The compression molding device according to claim 1, wherein the calculation part calculates the weight of the plurality of mounted objects by subtracting a weight of reference carrier from the weight of the workpiece.

4. The compression molding device according to claim 1, further comprising a thickness measurement part measuring a thickness of the reference carrier, wherein the calculation part calculates a weight of the reference carrier based on the thickness of the reference carrier, and calculates the weight of the plurality of mounted objects by subtracting the weight of the reference carrier from the weight of the workpiece.

5. The compression molding device according to claim 1, wherein the calculation part calculates a volume of resin after molding necessary to form the plurality of packages with a desired thickness based on the total volume of the plurality of mounted objects, and calculates a weight of resin after molding as the supply amount of the resin based on the volume of resin after molding.

6. The compression molding device according to claim 1, wherein the calculation part calculates a volume of resin after molding necessary to form the plurality of packages with a desired thickness based on the total volume of the plurality of mounted objects, calculates a weight of resin after molding based on the volume of resin after molding, and calculates a weight of resin before molding from the weight of resin after molding as the supply amount of the resin based on a weight change rate of resin before and after molding.

* * * * *